Figure 27:
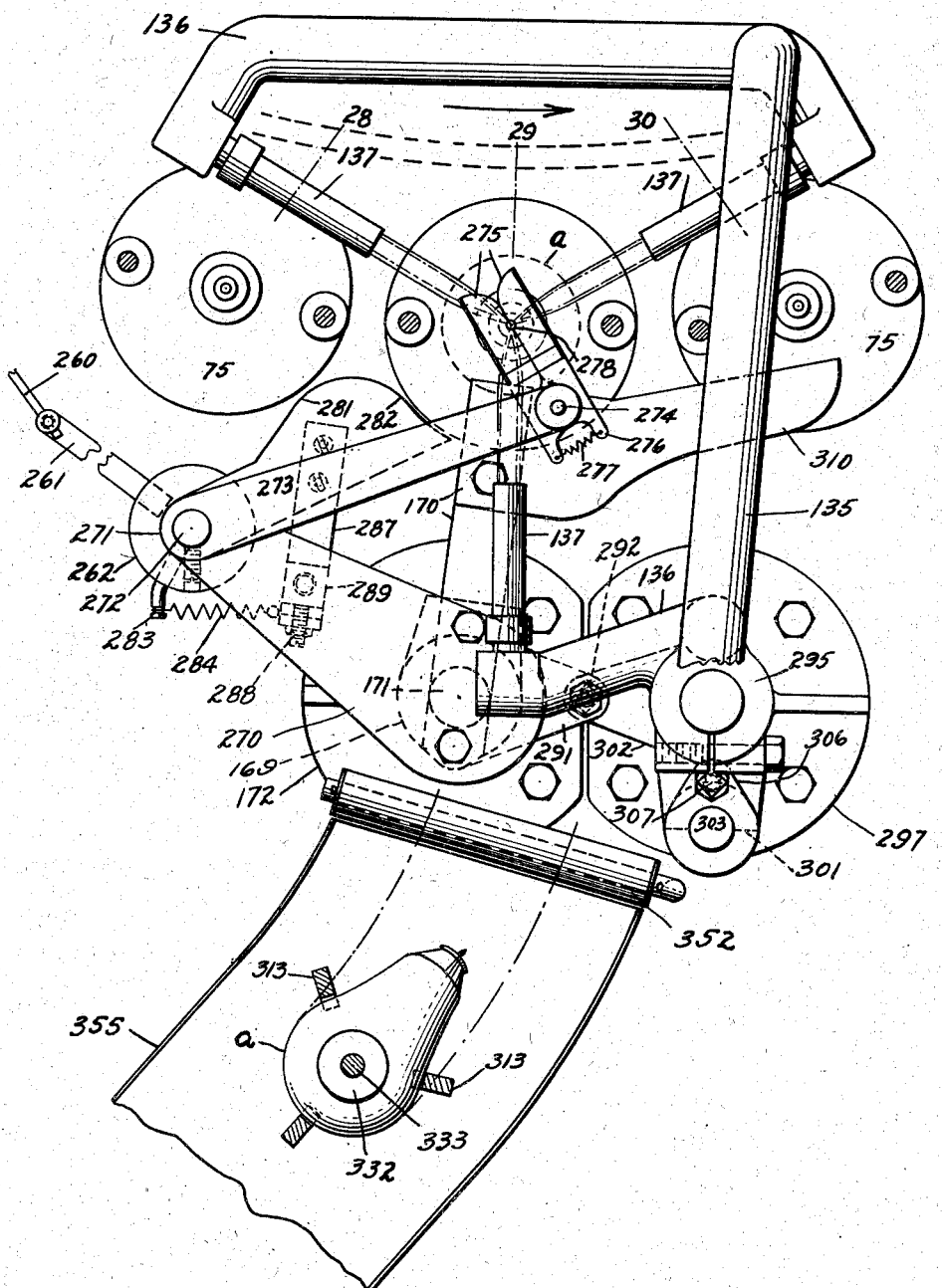

June 13, 1939.　　　D. G. TRUTNER　　　2,162,209
LAMP SEALING-IN AND EXHAUSTING MACHINE
Filed May 17, 1937　　　13 Sheets-Sheet 1
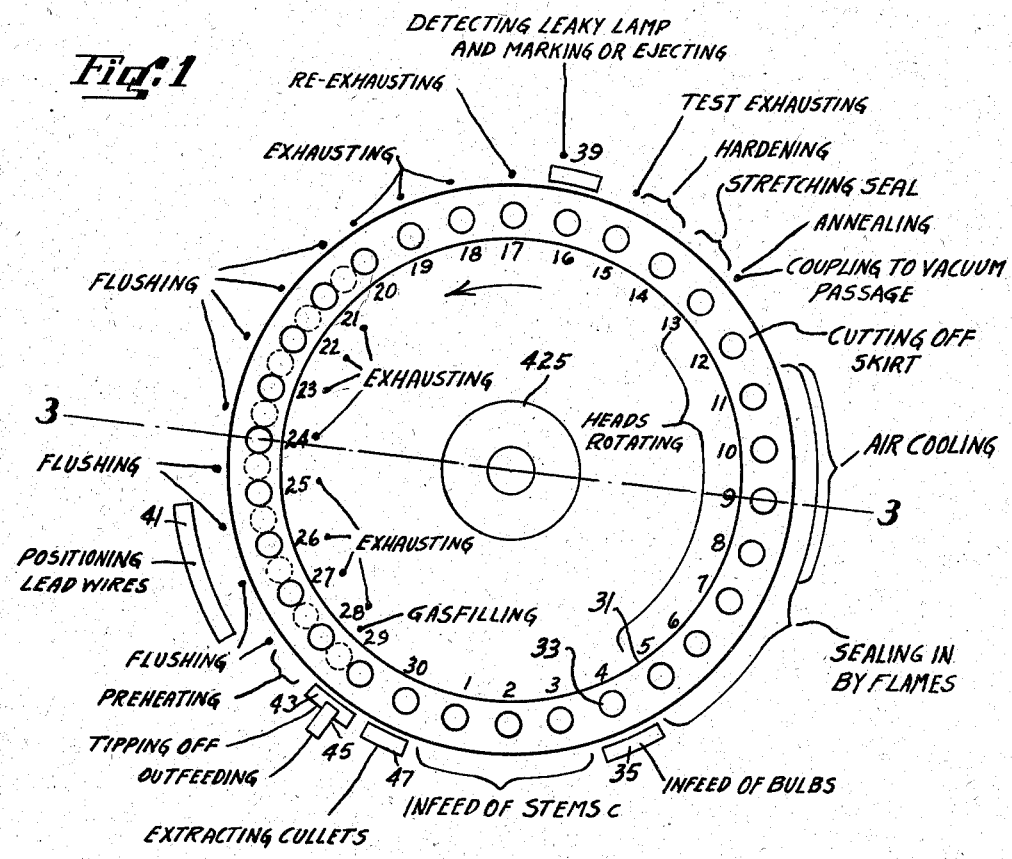
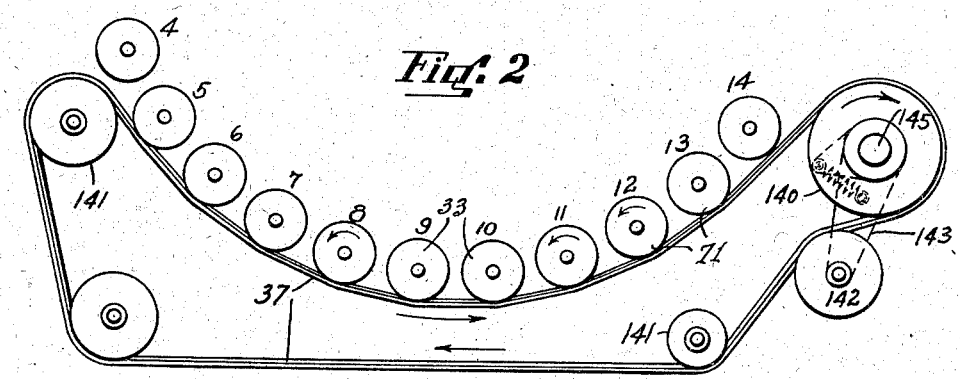
INVENTOR
D. G. Trutner
BY
Morrison, Kennedy & Campbell
ATTORNEYS.

June 13, 1939.  D. G. TRUTNER  2,162,209
LAMP SEALING-IN AND EXHAUSTING MACHINE
Filed May 17, 1937   13 Sheets-Sheet 2
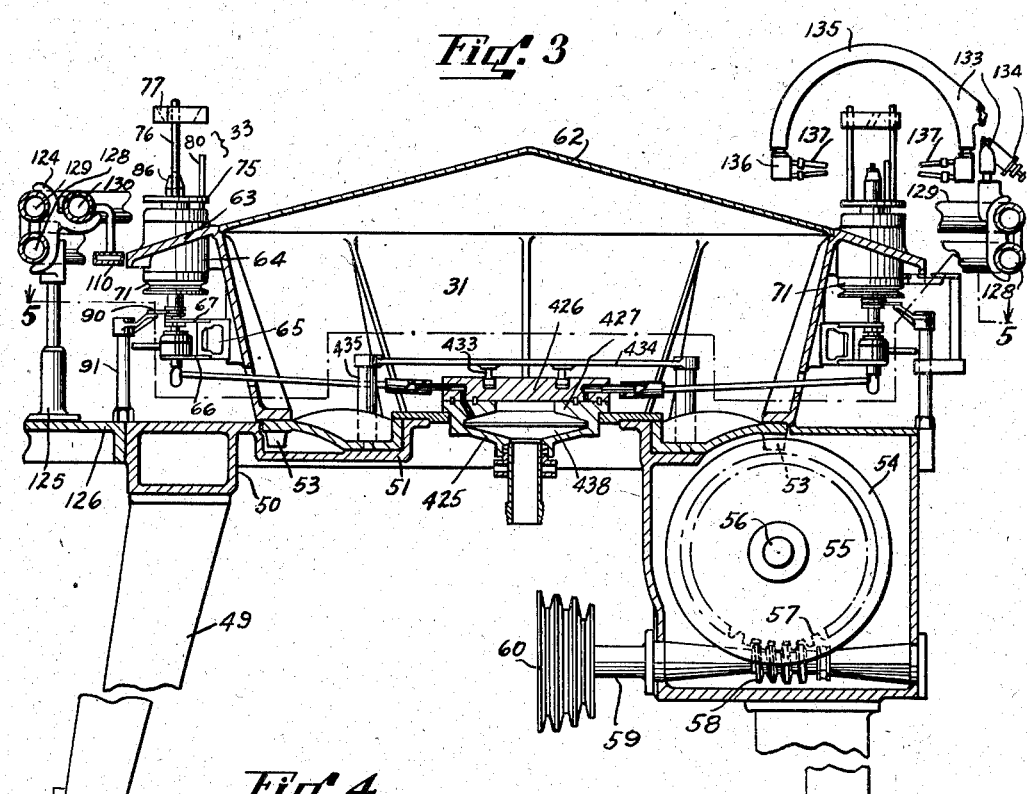
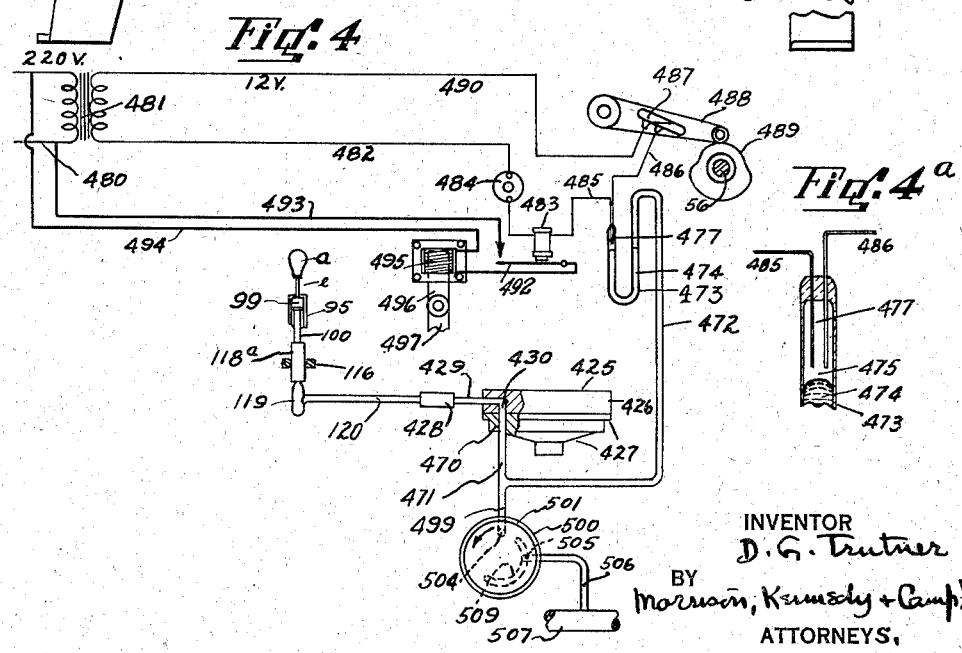
INVENTOR
D. G. Trutner
BY Morrison, Kennedy + Campbell
ATTORNEYS.

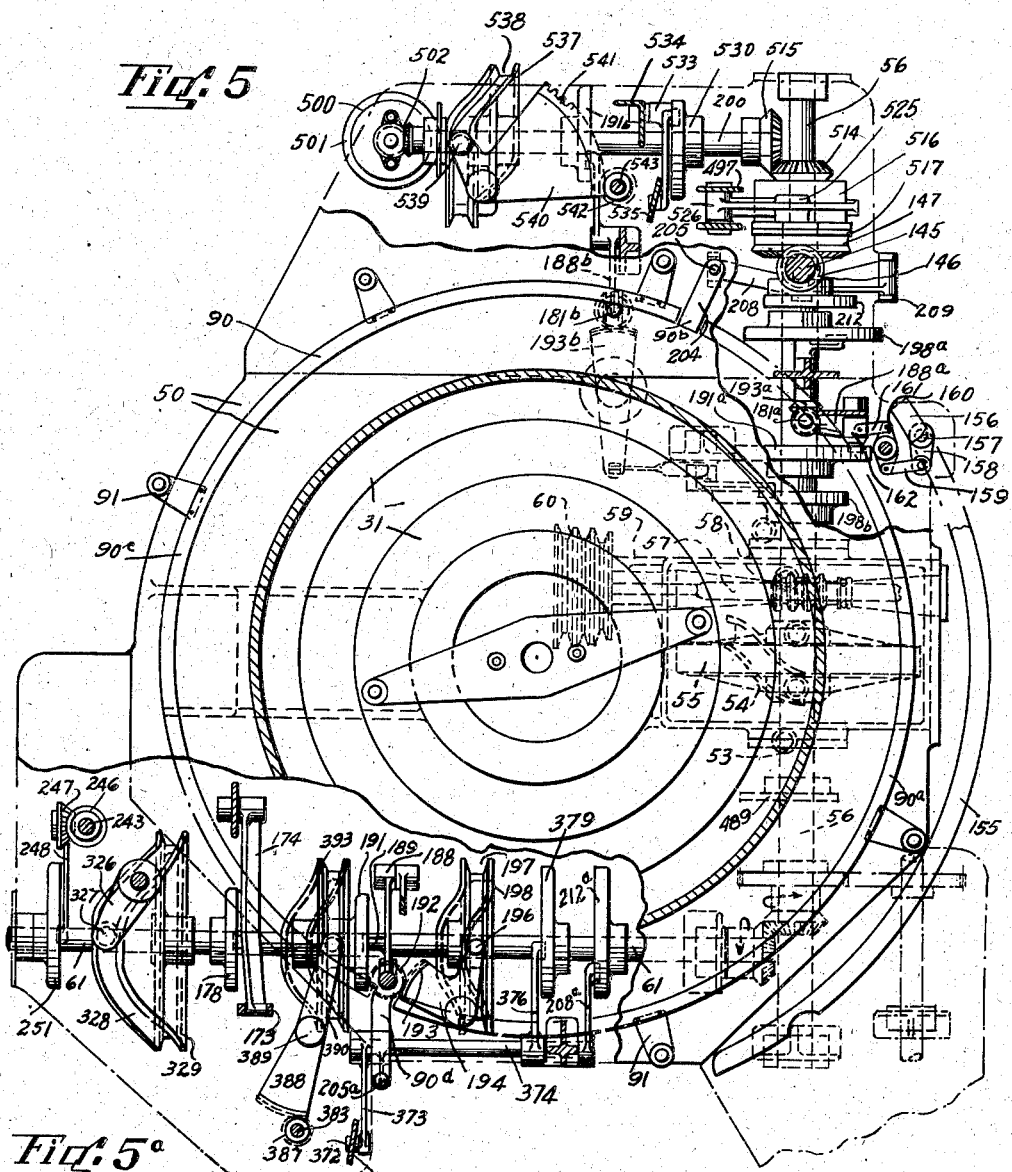
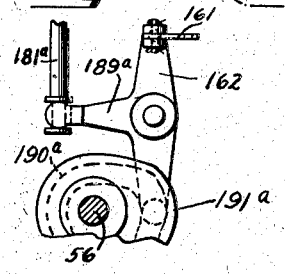

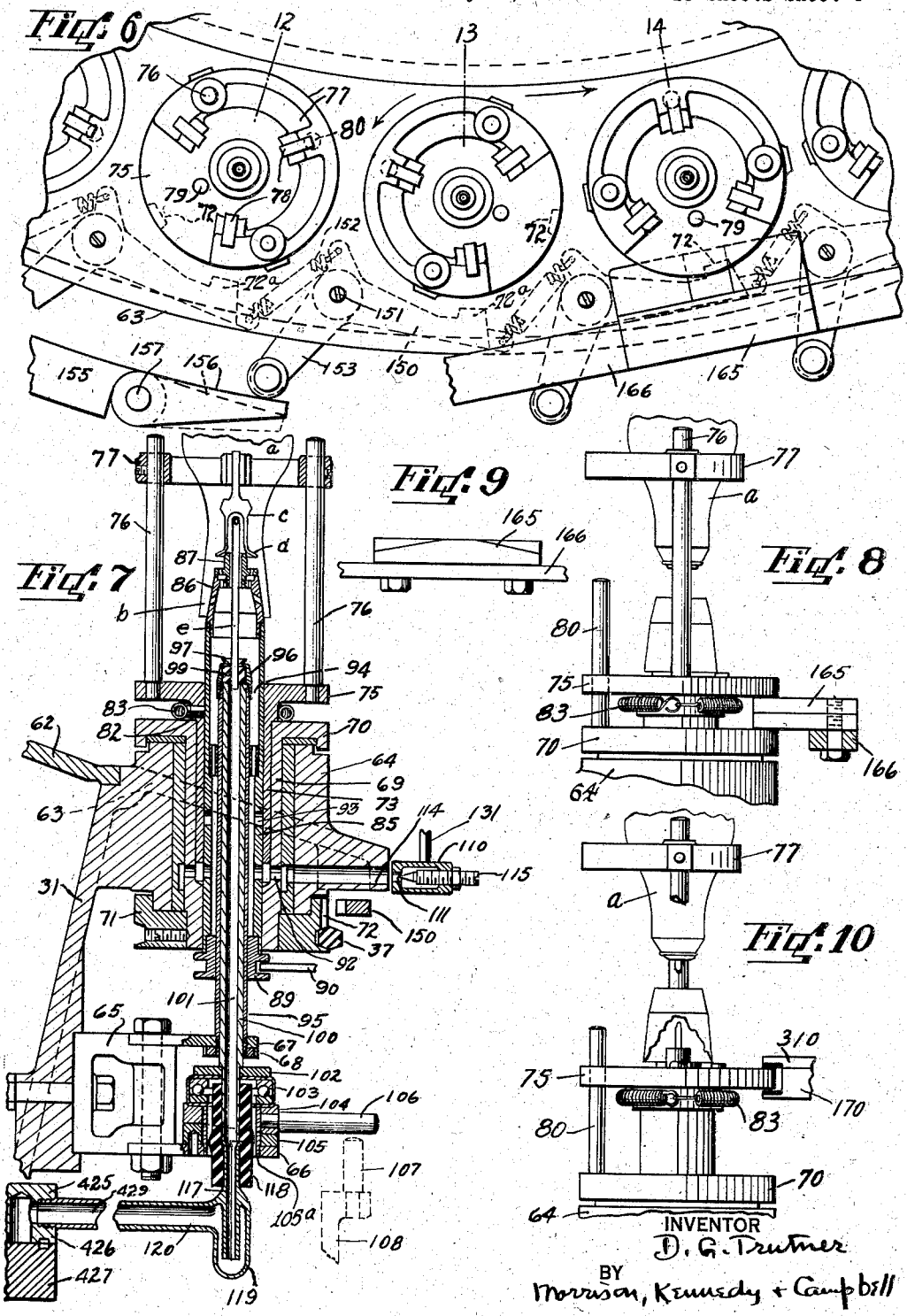

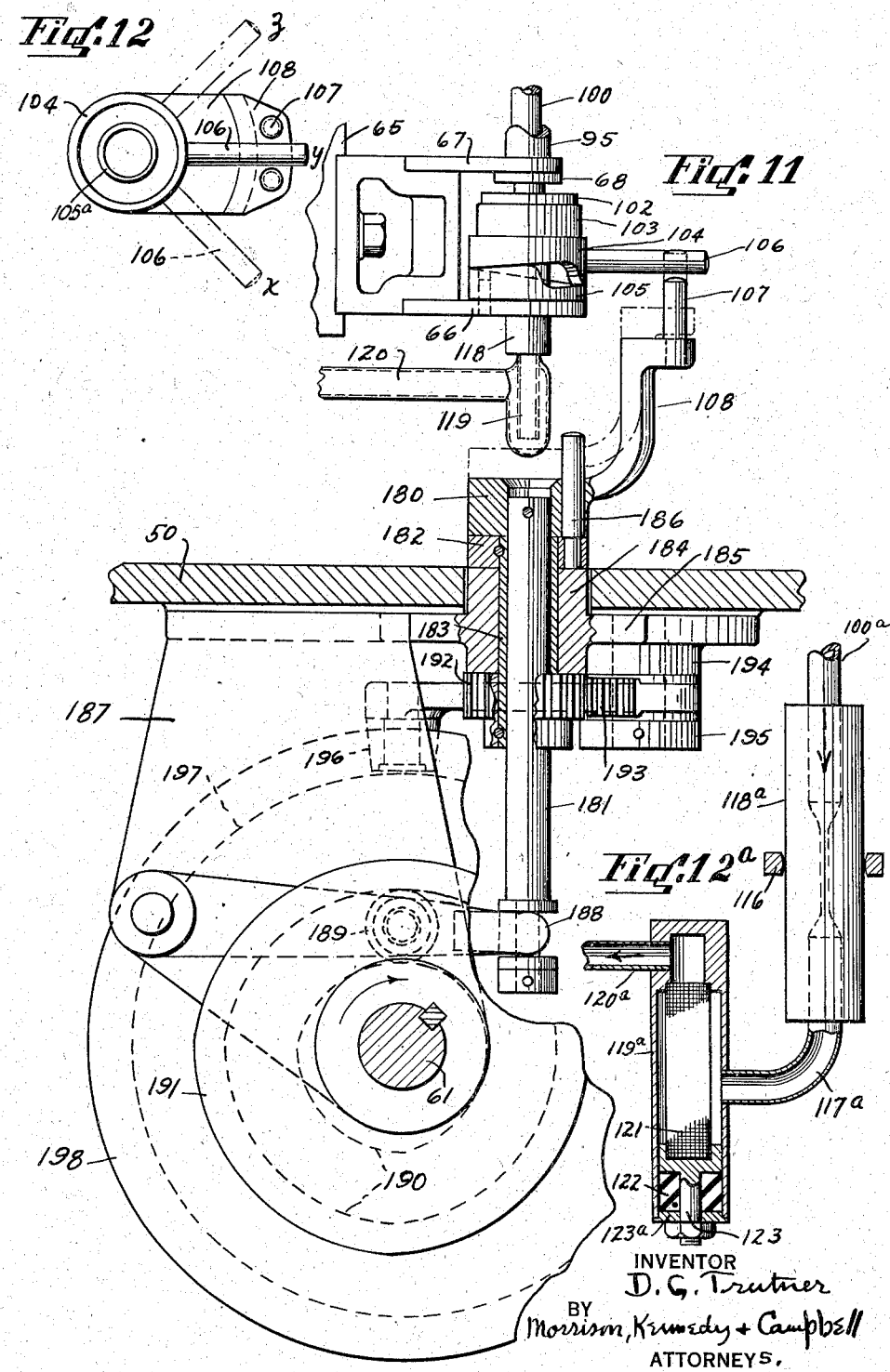

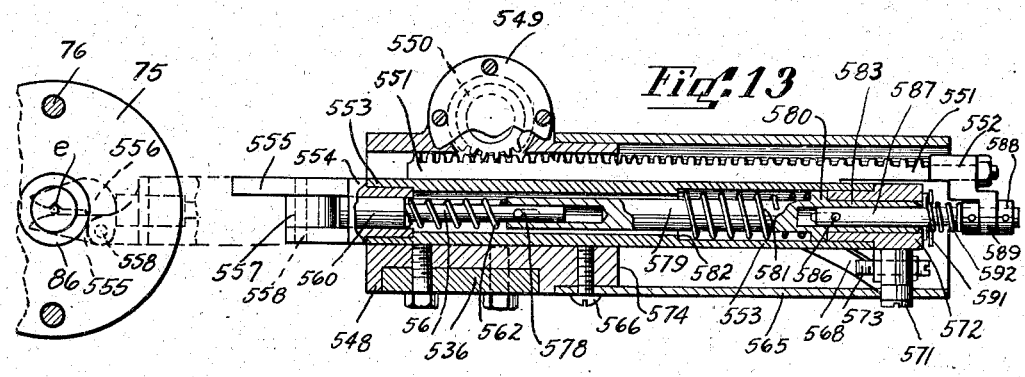
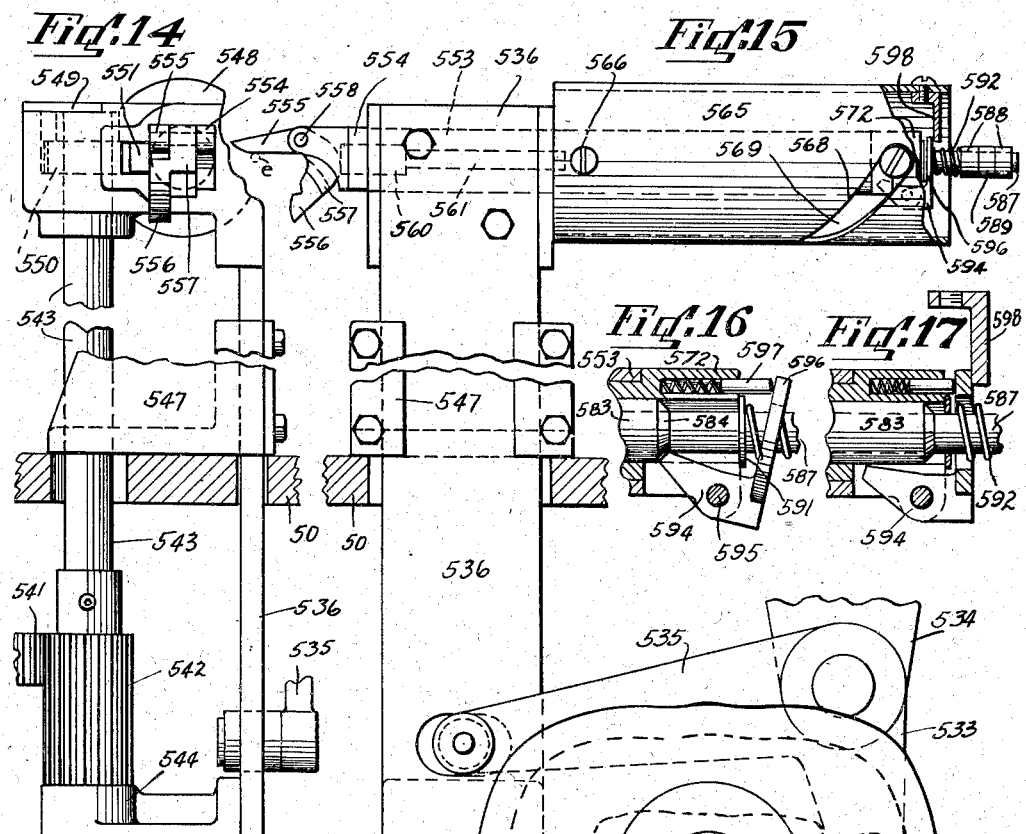
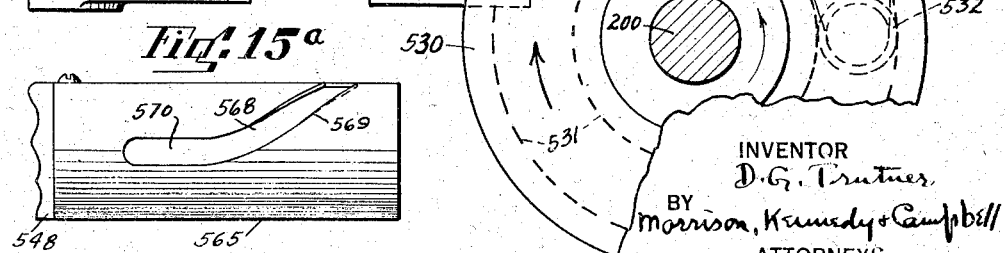

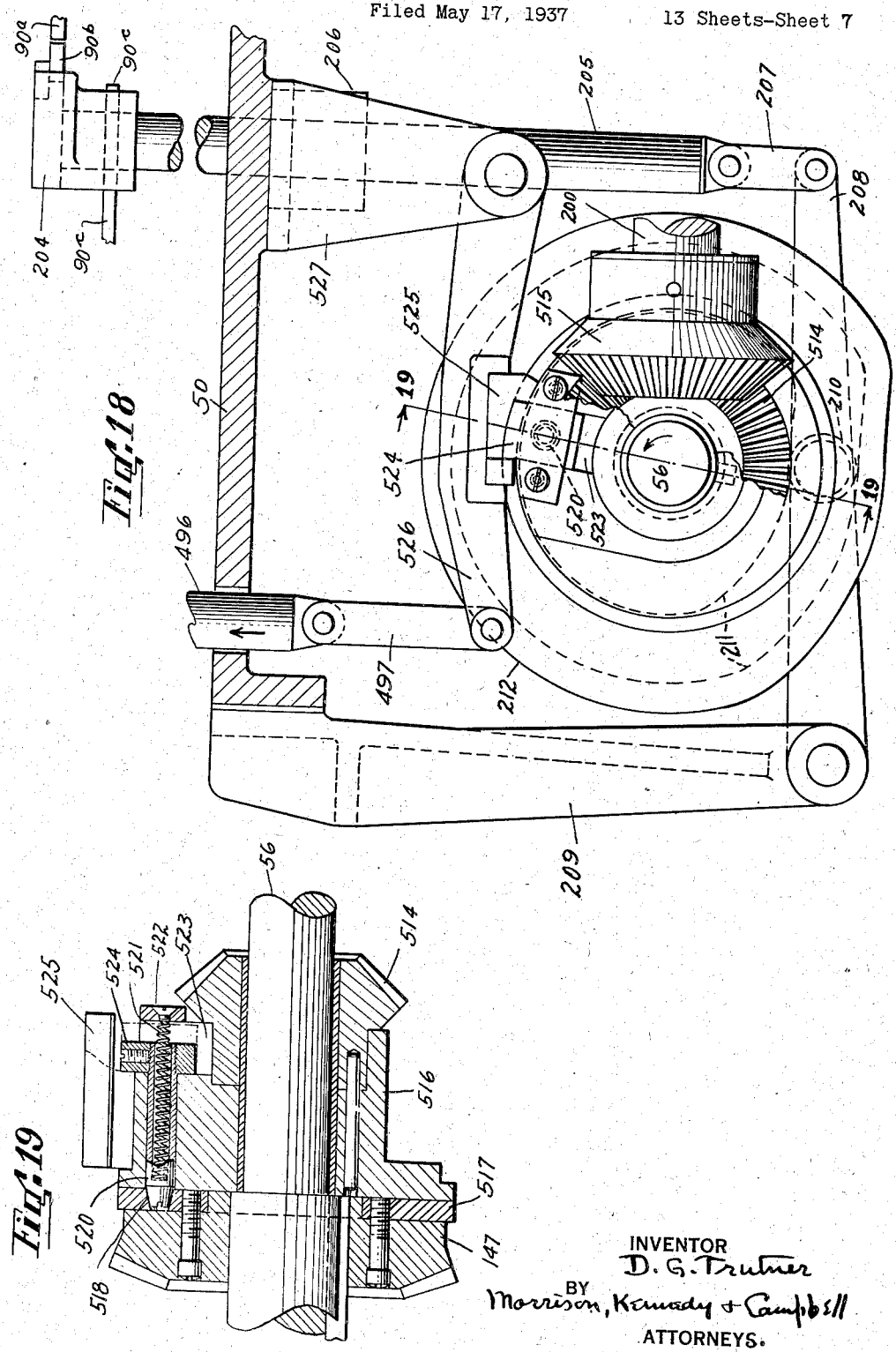

June 13, 1939. D. G. TRUTNER 2,162,209
LAMP SEALING-IN AND EXHAUSTING MACHINE
Filed May 17, 1937 13 Sheets-Sheet 8
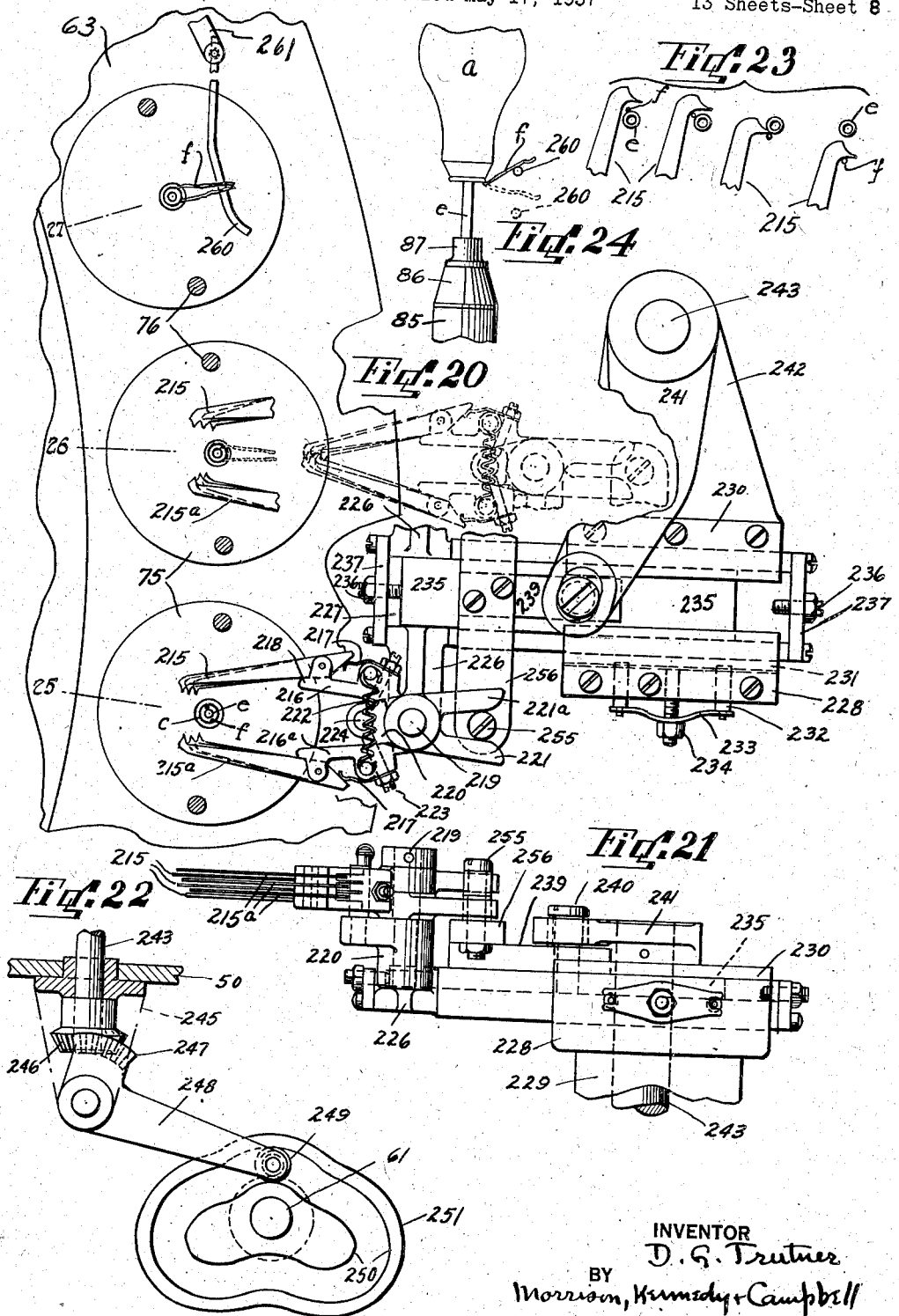
INVENTOR
D. G. Trutner
BY Morrison, Kennedy & Campbell
ATTORNEYS.

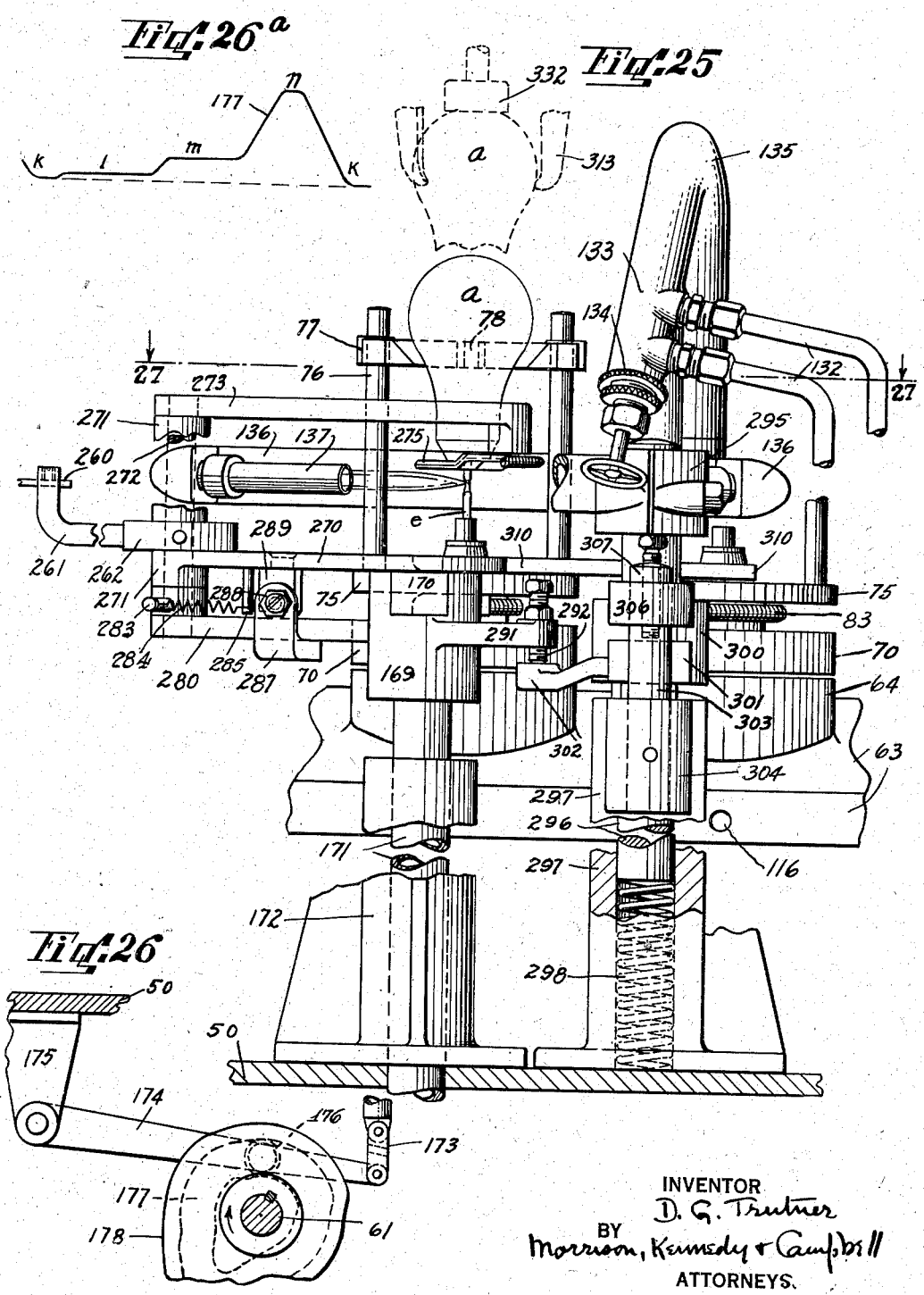

June 13, 1939.  D. G. TRUTNER  2,162,209
LAMP SEALING-IN AND EXHAUSTING MACHINE
Filed May 17, 1937  13 Sheets-Sheet 10

INVENTOR
D. G. Trutner
BY
Morrison, Kennedy & Campbell
ATTORNEYS.

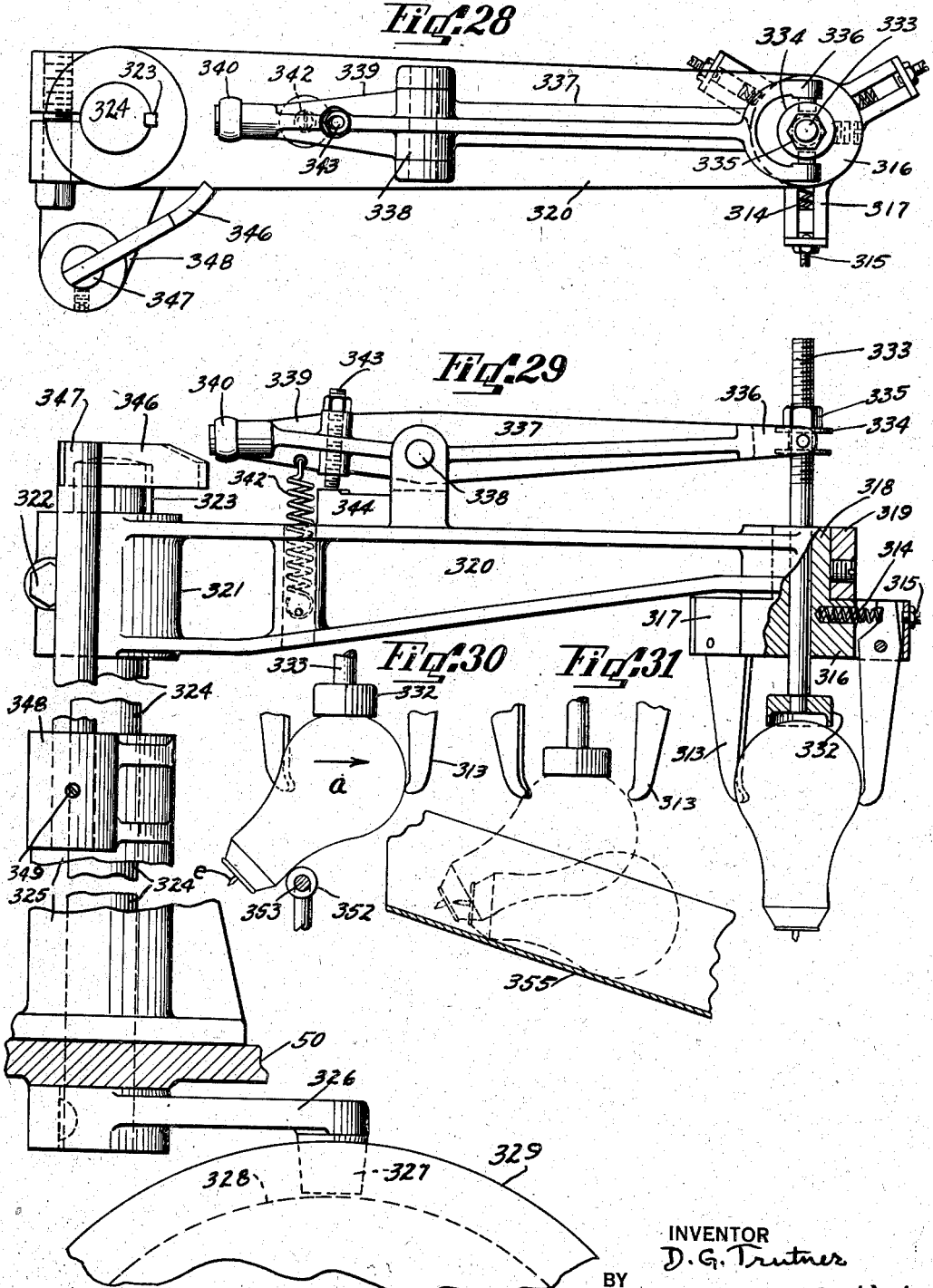

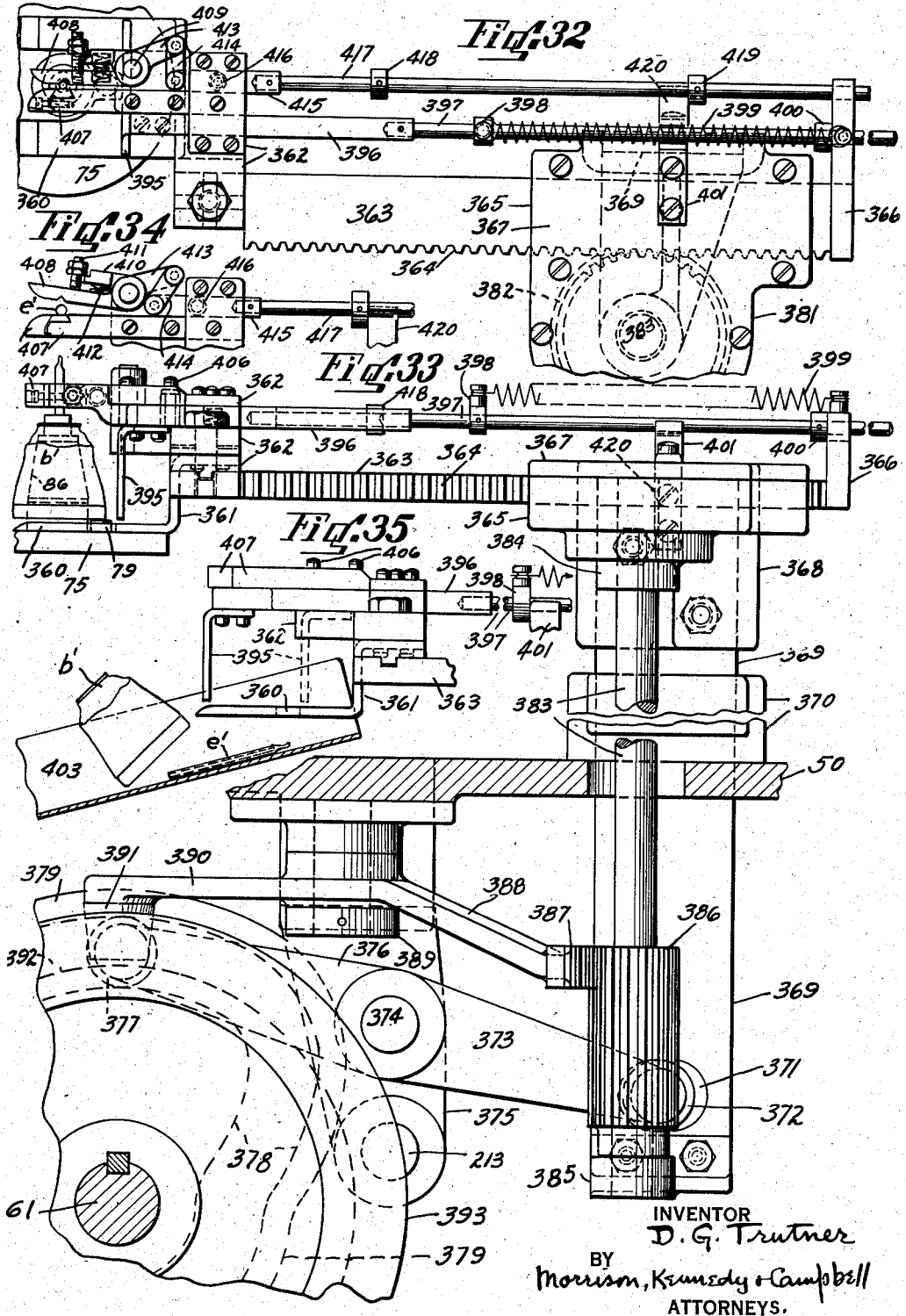

June 13, 1939. D. G. TRUTNER 2,162,209
LAMP SEALING-IN AND EXHAUSTING MACHINE
Filed May 17, 1937 13 Sheets-Sheet 13
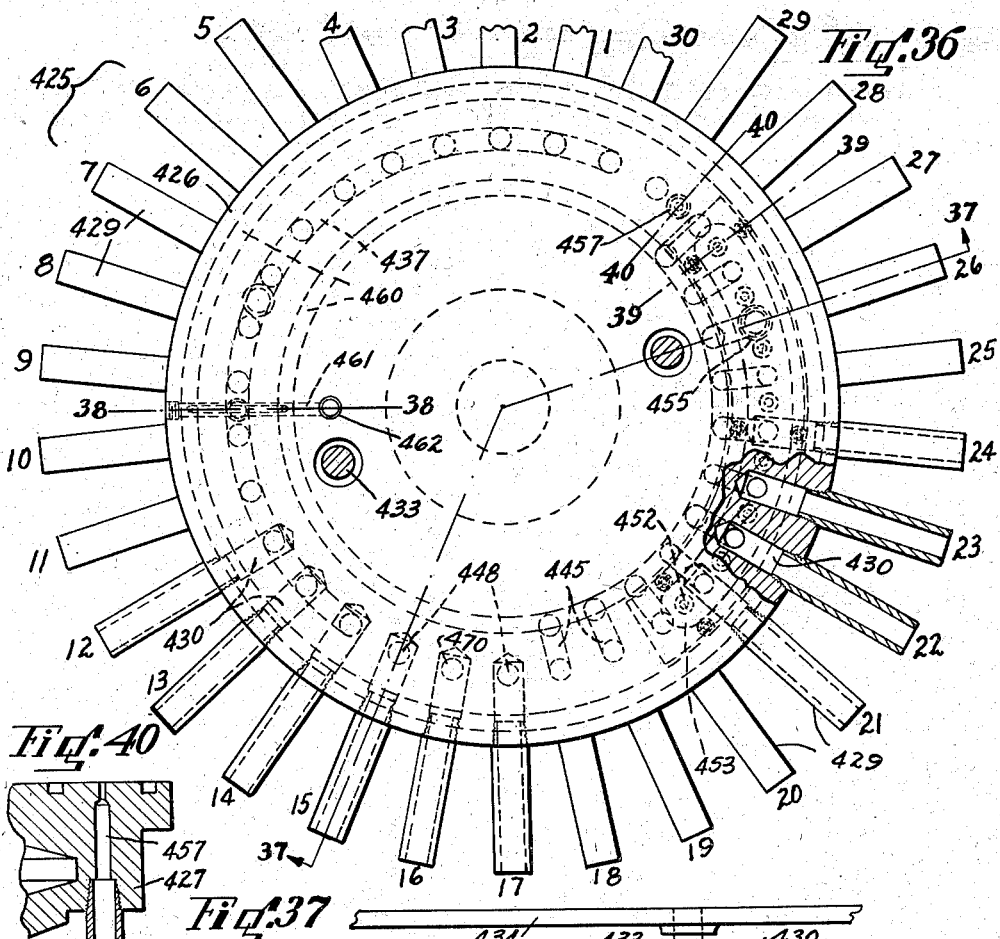
INVENTOR
D. G. Trutner
BY Morrison, Kennedy & Campbell
ATTORNEYS.

Patented June 13, 1939

2,162,209

UNITED STATES PATENT OFFICE 2,162,209

LAMP SEALING-IN AND EXHAUSTING MACHINE

Donald G. Trutner, North Arlington, N. J., assignor to Alfred Hofmann & Company, West New York, N. J., a corporation of New Jersey Application May 17, 1937, Serial No. 143,034

55 Claims. (Cl. 176—2)

This invention is a novel lamp sealing-in and exhausting machine, having to do with the fusing or uniting of the lamp bulb and the stem or mount, these being well-known glass parts, and thereafter exhausting or evacuating and finally sealing or tipping-off the product. The invention has reference to the manufacture of electric lamps of various classes, whether for illumination, radio or other purposes, in the nature of bulbs or tubes containing electrodes or filaments and either exhausted of air or filled with a special gas, the term exhausting being intended to include such filling. The present invention pertains particularly to a machine or automatic apparatus and method, to be used in the quantity manufacture of lamps, for performing in succession the sealing-in step and the exhausting step, including tipping-off, in a self-controlled manner; and is shown applied to the type of machine having an endless series of so-called heads or holding devices for the lamp parts, carried upon and advanced progressively around a path or circuit, preferably step by step, through a series of stations or positions at certain of which the successive operations are performed.

The position of the present improvement in the art may be indicated by reference to certain prior patents, as follows. The rotary turret type of machine used for other lamp making operations is shown in the patent of Trutner No. 1,990,258 of February 5, 1935, wherein the stem member of the lamp is manufactured, comprising a flange, an exhaust tube and other parts of glass, with leadwires embedded therein; and in Palucki No. 2,069,386 of February 2, 1937, wherein lamps are "finished". The prior art further shows many patents for performing the step of sealing-in, that is, fusing and uniting the skirt of the bulb member to the flare or flange of the stem member of a lamp; and it shows also many examples of exhausting machines, for evacuating the air from the sealed-in lamp and tipping-off or finally sealing the exhaust pipe. The art also shows combined apparatuses wherein the sealing-in is performed in one series of heads but the lamps thereafter have to be shifted manually to other heads for the exhausting step. An example of a patent showing the feeding of bulbs into sealing-in heads is Trutner No. 1,989,898 of February 5, 1935. An example of a head adapted for a combined sealing-in and exhausting apparatus is shown in patent of Anderson and Trutner No. 1,989,897 of February 5, 1935; this providing rotation of bulb and stem during sealing-in, followed by stoppage, and then coupling to exhausting connections; and the present invention is of this kind; but it is believed that no other machines of such kind are known, though machines are known wherein sealing-in followed by exhausting are performed in the same head but without rotation during sealing-in, and without the various novel features of the present invention.

One of the main objects of the present invention is to provide for the consecutive performance of the sealing-in operation and the exhausting operation in prompt sequence, as the lamps traverse their path or circuit, and without the necessity of any transfer of the sealed-in lamp from one head or conveyor to another. Specifically an object is to provide an automatic machine of the rotary turret type with a single series of heads wherein both the sealing-in and the exhausting operations are performed, including tipping-off, without transfer of the lamp from one head or series to another. Another object is the provision of a head or lamp-holding structure of improved construction and operation, adapted for the performance of both the sealing-in step and the exhausting step. Further objects include the provision of various cooperative steps, as the stretching of the seal, testing each lamp for leaks, repositioning the leadwires before tipping-off, stretching the exhaust pipe during tipping-off, and removing the cullets or fragments; and mechanisms for performing these steps, between the infeed of the bulb and stem members and the outfeed of the final product, and also an improved outfeeding mechanism therefor.

Further objects and advantages of the present invention will be explained in the hereinafter following description of an illustrative embodiment thereof or will be manifest to those conversant with the subject. To the attainment of the recited objects and advantages the present invention consists in the novel sealing-in and exhausting machine, and the novel features of operation, method, combination, arrangement and construction herein illustrated or described.

In the specification, for convenience, the term "front" and similar terms will be used to denote a direction or position outwards with respect to the circular series of heads or to the vertical axis of the turret, at any given part of the circuit, and the terms "back" or "rear" to denote the reverse thereof; and it is to be understood that various statments of direction and the like, as up, down, etc., are intended to be relative and used for greater facility of description.

In the accompanying drawings, on sheet 1, Fig.

1 is a schematic plan view or diagram of the preferred arrangement and order of operation of the several steps and mechanisms involved in this invention, laid out with relation to the intermittent progress of the circular series of heads, of which thirty are shown with one standing at each station or position, and the diagram indicating by legends the preferred order and nature of the successive operations, the mechanisms of which are illustrated in subsequent figures or otherwise disclosed. Fig. 2 is a diagrammatic plan view showing the means for rotating the rotary portions of the heads during their travel from station 6 to station 13, for the sealing-in and skirt cutting-off operations.

On sheet 2, Fig. 3 is a general vertical section taken diametrically through the opposite positions or stations 9 and 24, on the line 3—3 of Fig. 1. Fig. 4 is a diagram of the wiring and control devices, and showing the relation of the electric control to certain of the vacuum connections, in respect to the detection of defective lamps at station 16. Fig. 4ᵃ is an enlarged detail of part of Fig. 4.

On sheet 3, Fig. 5 is a general plan view of the machine, but with the heads and their mountings omitted, taken substantially on the line 5—5 of Fig. 3, but broken away at several points to show better the underneath arrangements of shafts and operating connections. Fig. 5ᵃ is a detail elevation view of certain parts of Fig. 5.

On sheet 4, Fig. 6 is a top plan view of a short extent of the rotary turret, showing the heads at stations 12, 13 and 14, and illustrating the means for stopping the head rotation, also the means for the stretching of the lamp seal after the coupling at station 13 of the lamp to the vacuum connections. Fig. 7 is a vertical fore-and-aft or radial section of one of the heads, beyond the bulb-receiving station, for example at stations 8—11, whereat the head is receiving cooling air. Fig. 8 is a left elevation of the head and stretching cam or wedge, at station 14, whereat the lamp has been lifted and the seal stretched. Fig. 9 is a front elevation of the seal stretching cam. Fig. 10 is a left elevation of the head in its adjustment at station 29, the lamp being shown elevated for outfeeding purposes.

On sheet 5, Fig. 11 is a fore-and-aft vertical section on an enlarged scale of the lower part of the head of Fig. 7, with downward continuation showing the mechanism for effecting the coupling and uncoupling of each lamp to and from the vacuum connections, this figure showing the upper parts in coupling position as they will be at stations 13 to 30 (with an exception at Fig. 16 to be stated) and showing the lower or actuating parts as they are arranged at station 30, this being also representative of the mechanisms at stations 13 and 16. Fig. 12 is a partial top view of Fig. 11 showing in full lines the coupling position of these parts, the dotted lines showing other positions, as inscribed. Fig. 12ᵃ is a view similar to the lower part of Fig. 7, showing a modified construction of trap and adjacent parts.

On sheet 6, Fig. 13 is a horizontal section looking from above, taken centrally through the device or ejecting mechanism which operates at station 16 to engage and remove from the machine any lamp which has been determined to be unable to hold its vacuum, shown in position with the parts retracted and the defective lamp discarded; certain of the parts being shown additionally in dotted lines in their advanced position engaging the lamp in a head. Fig. 14 is a rear elevation of the same parts, that is, looking at the left end of Fig. 13. Fig. 15 is a left elevation of the same parts, at the same position as Figs. 13 and 14. Fig. 15ᵃ is a partial bottom plan view showing the jaw tilting cam or slot. Figs. 16 and 17 are central section views in left elevation of certain details of Figs. 13 to 15, Fig. 16 showing the position while the lamp removing jaws are latched closed, and Fig. 17 when they are unlatched and released.

On sheet 7, Fig. 18 is an elevation in substantially front view showing the details of the clutch for coupling to the drive shaft the defective lamp ejecting mechanism, and the clutch controlling means; and showing also the connections for effecting the lowering of the lamp stem support or mount sleeve at station 15. Fig. 19 is a vertical section taken on the line 19—19 of Fig. 18.

On sheet 8, Fig. 20 is a top plan view taken at stations 25, 26 and 27 and showing the devices which deflect frontwardly the depending leadwires and bend them up out of the reach of the tipping-off flames, during pauses of lamp travel. Fig. 21 is a left elevation of the mechanism shown in Fig. 20. Fig. 22 in left elevation is substantially a downward continuation of Fig. 21 on a smaller scale, showing the actuating connections and cam. Fig. 23 is a diagrammatic view showing four successive positions of one of the wire pulling hooks of the deflecting device in relation to the lamp exhaust tube and the wire to be deflected. Fig. 24 is an elevation view showing the operation of an additional wire bending-up finger, shown also on Figs. 20 and 27.

On sheet 9, Fig. 25 is a front elevation taken at station 29 showing the tipping-off mechanism, with dotted lines showing part of the outfeeding movement. Fig. 26 is substantially a downward continuation of Fig. 25 on a smaller scale, showing the cam and actuating connections therefor. Fig. 26ᵃ is a diagram of the contour and action of the cam of Fig. 26, showing the bulb holder up and down movements at station 29.

On sheet 10, Fig. 27 is a top plan view of the mechanism shown in Fig. 25, partly in section on the line 27—27 of Fig. 25.

On sheet 11, Fig. 28 is a top plan view of the unloading or outfeeding device at station 29, preferably located and operating directly above the tipping-off device at the same station. Fig. 29 is an approximately right elevation of the mechanism shown in Fig. 28. Figs. 30 and 31 are partial right elevations showing later stages of position of the lamp, illustrating respectively its tilting and its discharge into the outfeeding chute.

On sheet 12, Fig. 32 is a top plan view of the mechanism for extracting from the head at station 30 the cullets or remaining fragments of the lamp skirt and the exhaust tube, the parts in cullet engaging position. Fig. 33 is a left elevation of the same mechanism and in the same position as in Fig. 32. Fig. 34 is a partial top view of the tube cullet removing device showing it retracted and the extracting jaws open. Fig. 35 is a left elevation of the skirt cullet removing device showing the stage wherein the extracted fragments have been discharged into the chute.

On sheet 13, Fig. 36 is a top plan view of the centrally located vacuum valve of this invention partly broken away to show interior construction. Fig. 37 is a vertical section view of the same taken on two different radii according to the line 37—37 of Fig. 36. Figs. 38, 39 and 40 are vertical section views taken on the lines 38—38, 39—39 and 40—40 respectively of Fig. 36.

The lamp parts dealt with in this machine are shown in various figures and comprise the glass bulb $a$ having below its neck the usual depending skirt $b$, which is subsequently removed, forming a cullet $b'$. The lamp stem member $c$ may be such as is produced in the machine of said Patent No. 1,990,258. The stem $c$ comprises at its lower part a flare or flange $d$, to be united to the bulb neck, and has an axially extending tube or pipe $e$ by which the lamp may be exhausted or gas-filled, its lower end being later removed, forming a cullet $e'$. Leadwires $f$ depend below the stem flange, as usual, alongside the exhaust tube. The present machine performs the sealing-in or fusing of the bulb neck to the stem flare of each lamp, and the exhausting or gas-filling, and the final tipping-off or sealing of the exhaust pipe, all in the same head. The stem part when fitted with filaments or electrodes is termed a "mount" but they are not here concerned and are omitted from the disclosure.

The diagram Fig. 1 indicates thirty stations numbered 1 to 30, at various ones of which the operations of this invention are performed. It shows also the turret 31 carrying the succession of thirty heads 33. The inscriptions indicate the preferred order of operations and arrangement, which may be reviewed as follows.

Between stations 1 and 3 each head may be supplied with a lamp stem $c$; for example the operator may insert from above the stem member by hand while the head is pausing at stations 1, 2 or 3; the stem flange to rest upon a stem support 86, 87 on a "mount sleeve" or shank 85, with the tube $e$ and wires $f$ hanging therein and with the tube therebelow engaged loosely in an open coupling or plug 99, as later described. At station 4 is indicated a bulb loading or infeeding mechanism 35. This is not shown in detail as it may conform with that shown in said Patent No. 1,989,898; the bulb being received on an overhead holder 77 to be described. A photocell detector may prevent infeed of bulb to a head from which the stem may be missing. The stem support and bulb holder retain and carry these parts, positioned in axial alinement, the skirt surrounding the flange, ready for sealing-in.

Beginning with station 5, and for a number of stations, the lamp and the head parts supporting it are rotated continuously whether pausing or traveling. For this purpose is a belt 37 shown in Fig. 2 and to be described further. The rotation of the heads, that is of the bulb holder and stem support, is accompanied by the sealing-in operation, comprising the applying of flames to the bulb neck. These lamp rotating and heating actions may continue from station 5 through station 13. The fusing of skirt to flare is accomplished before reaching station 11, while between stations 8 and 11 a cooling air stream may be flowed through the heads to prevent overheating and damage to the coupling plug. At station 12 is the operation of removing or blowing off, by a more forcible internal air pressure, the glass skirt extending below the sealing point, the skirt being thus detached as a cullet $b'$, to be carried loosely by the parts within until extracted. This skirt removing operation by an air puff is assisted by an intense cutting flame applied at the cut-off point, which melts the glass while the air within swells and bursts it, the seal or joint then smoothing itself under the applied heat, all during lamp rotation. At station 13 the joint may be "annealed" by a change to a mild frame.

At station 13 the rotation is stopped, and the bulb holder is arrested in a definite position; and the exhaust tube $e$ is then gripped by the surrounding plug and so coupled to the exhausting connections. At or approaching station 14, while still maintained warm and soft, the fused joint or seal between bulb and flare may be stretched by the lifting of the bulb holder 77, say $\frac{1}{8}$ inch, while the vacuum coupling holds down the stem; after which the joint is allowed to solidify or harden. The bulb holder may now descend, as it advances, leaving the sealed-in lamp thus supported only by its exhaust tube held upright by the coupling plug. Or the holder may remain in position to steady the lamp, while the stem support, at station 15 or later may descend to expose the leadwires and exhaust tube.

At station 15 the lamp is exhausted by a preliminary or testing vacuum, and at station 16 is the ejecting mechanism or device 39 operating when detecting leakage therein. The lamp may then be re-exhausted at station 17 by the test vacuum, and thereafter, for example from stations 18 to 20, it may be subjected to final or full vacuum. Therebeyond the evacuation may be alternated with flushing or partial filling by a suitable inert gas, as sometimes practised in making gas-filled lamps, in which case the filling gas may be admitted between stations 28 and 29. The flushing may be omitted if an evacuated lamp is to be manufactured, and evacuation may continue to station 29.

At stations 25 to 27 is indicated the step of and device 41 for pulling frontwardly from the tube $e$ and positioning out of the way the loosely extending leadwires $f$ of the lamp, preparatory to the tipping-off. At station 28 the preheating of the exhaust tube in preparation for the tipping-off action. At station 29 is indicated the tipping-off operation and a device 43 therefor; also the outfeeding or unloading operation and mechanism 45 therefor; these cooperating herein in that the lifting of the lamp serves both for the stretching of the exhaust tube in the tipping-off and for the outfeeding. At station 30 is the operation of and mechanism 47 for removing the glass fragments, namely the cullets or discarded pieces of skirt $b'$ and tube $e'$.

*General parts and head construction*

The general machine parts, as seen in Figs. 3, 5 and elsewhere, comprise frame legs 49 supporting a generally circular table 50, the inner portion 51 of which is shaped to give rotary support to the turret 31.

The turret construction and operation may be generally similar to that shown in Patent 1,990,258. The turret has a series of depending studs 53 which, in succession are engaged by a drive cam 54 on the periphery of a wheel 55 secured on a horizontal drive shaft 56. There are thirty studs in a thirty head machine, so that with each cycle or rotation of the shaft the turret advances to the extent of one head or station. The primary drive shaft 56, through bevel gears drives always a secondary drive shaft 61 and occasionally, through clutch 51$^b$, a third drive shaft 200, both at right angles to the primary shaft, and each making one turn per cycle.

Also the drive shaft carries a worm wheel 57 engaged by a worm 58 mounted on a power shaft 59 carrying one or more pulleys 60 which may be driven by belt from a motor or otherwise.

The turret is shown as provided with a removable cover piece 62. The turret also has a fixed outwardly extending flange 63 formed with a series of thirty cylindrical bearings 64 constituting the support members of the heads.

The details of the head construction are shown more particularly in Figs. 6 to 10. In Fig. 7 the bearing or bracket 64 is shown supporting the rotary parts of the head. At a lower part of the turret is an attached bracket 65 from which extend outwardly a lower extension or bracket 66 and an upper bracket 67, these having circular holes in vertical alinement with that in the cylindrical bracket 64. Adjacent to the bracket 67 is a lock nut 68 by which a sleeve 85 to be described is fixedly mounted on the bracket.

The rotary parts of each head comprise primarily the bulb holder 77 and stem support 87, and with these their hollow shanks or vertical sleeves, which are also vertically slidable, and other parts carried by or connected therewith. Thus within the cylinder or bearing 64 is a first or outer vertical sleeve 69, with bushing or lining between them. The first sleeve 69 is rotatable but not vertically movable, and its top end is formed with an outward flange 70 overlying the top of the bearing. The lower end of the first sleeve carries a pulley 71, seen also in Figs. 2 and 3, this being engaged tangentially by the belt 37, by which the heads at stations 5 to 13 are rotated. The pulley 71 is formed also with a notch 72 cooperating with a stopping member 150 on each head put into effect at station 13, by which the rotation is arrested and the parts locked in a definite angular position.

Referring to the remaining head sleeves in their assembled order, the second or bulb holder sleeve 73 is fitted within the sleeve 69, and it is arranged to rotate therewith while capable of sliding therein. At its top end the sleeve 73 carries a circular disk 75 and slightly therebelow a shoulder resting upon the flange 70 so that the sleeve 73 depends within the sleeve 69. Upstanding from the disk 75 is a pair of rods 76 which, with the disk and with a top piece 77 constitute a rotary frame for holding the bulb or lamp and at times for elevating it as will be described. The top piece 77 may be open at one side like the letter C, as usual, and contains three interior projections or lugs 78 giving concentric support to the bulb. The frame 75—77, or merely the supporting ring 77 may be considered the bulb holder, this being supported on its hollow shank, the sleeve 73. In order to cause the bulb holder to rotate with the pulley-driven sleeve 69 a post 80 is provided upstanding vertically from the flange 70 and passing slidably through a hole in the disk 75 as shown in Figs. 6 and 8.

The third or stem-support sleeve 85 may slide vertically within the second sleeve 73, and they may rotate together as by friction. The sleeve 73, just below its disk 75, is shown with a series of radial perforations containing friction pins or plugs 82, all pressed inwardly by a surrounding coil spring 83 so as to bear upon the sleeve 85 within, affording a frictional drive by which they normally turn in unison, while allowing longitudinal slippage for relative lifting and lowering. The third or mount sleeve 85 at its top end carries a hollow end piece 86, on top of which is mounted a perforated top piece or support 87, at the top edge of which the flare d of the lamp stem initially rests, the stem tube and leadwires passing centrally loosely down through the members 87 and 86. At its lower end the sleeve 85 carries or rests upon a flanged or grooved head 89 cooperating with a track or cam 90. The cam 90 is not a part of the head, but it may consist of a fixed track, like a flange, extending around the orbit of travel, and having portions 90ª and 90ᶜ at two levels with intermediate means or elevators 90ᵇ and 90ᵈ by which the sleeve 85 may be lowered and lifted at certain times, as later described. The track sections 90ª and 90ᶜ are supported by fixed posts 91.

Within the sleeve 85 is a fourth or fixed sleeve 95, the two being spaced apart, providing an annular channel 94 by which air may be supplied to flow upwardly between the sleeves and thence through the members 86 and 87, for delivery near the fusing or sealing-in point, gently or forcibly as already indicated. The sleeve 95 carries a hollow top piece 96 with flared end 97 to receive readily the stem pipe e. The top piece carries within it a centrally perforated coupling shown as a soft rubber body or plug 99 through which normally the glass pipe may be easily inserted, and within which it may freely rotate until the plug has been compressed to grip the pipe. The sleeve 95 is fixed by its lower end, being shouldered to engage the bracket 67 and threaded for the locknut 68.

Within the fourth sleeve 95 is a fifth or suction sleeve 100, the upper end of which contacts the coupling plug, and is slightly flanged to overlie the top of the fourth sleeve and to extend to the walls of the hollow top piece 96. By relative lifting movement of the fifth sleeve the coupling can thus be vertically compressed, which causes radial contraction of its central bore or aperture. This lifting action therefore seals the coupling plug both to the glass pipe within and to the top end of the fifth sleeve, thus connecting the two in a suction-tight manner for the exhausting operation, the passage 101 within sleeve 100 being a part of the suction connections. Such plug compression may also be utilized in the case of a defective lamp removed from any head to close entirely the plug aperture and prevent loss of vacuum at such head.

The fifth or innermost sleeve 100 has a shoulder above its lower end by which it rests upon a surrounding disk 102 that overlies a thrust bearing 103. Beneath the thrust bearing is a cooperating pair of cam disks 104 and 105, each having an inclined surface so that relative rotation causes the camming apart of the disks. See also Fig. 11. As the lower disk 105 rests upon the fixed bracket 66, the rotation of the upper disk causes the lifting of the disk and innermost sleeve 100, and thereby the tight coupling of the lamp to the exhaust connections. To effect the cam action the upper disk is shown as having a radially projecting arm 106 which may be swung as by means of an upstanding pin 107 mounted on a rockarm 108 controlled as will be described.

At certain stations a means is provided for supplying air to rise in the annular space 94 between the head sleeves 85 and 95. A fixed air conduit or manifold 110 is shown, see Figs. 3 and 7, having ports 111, at stations 8 to 11, controlled by valves 115. These fixed ports each aline with a passage 114 in the bearing 64 of each head. Inwardly thereof the sleeves 69, 73 and 85 are formed with apertures or annular chambers 92 by which compressed air supplied in conduit 110 can flow into the channel 94, thence to rise into the end piece 86 and flow gently through the apertures in top piece 87 as already described. At station 13 a single air connection may deliver the forcible air flow through the same passages for blowing off the skirt. Additional manifolds are understood at points beyond, for example stations 14 to 25 to afford cooling and protect the coupling plug from the heat of the surrounding mount sleeve. When and after sleeve 85 has been lowered, at or preceding station 25, it is important to cool the coupling device 99 against the adjacent tipping-off heat; and for this the sleeve 85 has a special upper port 93, Fig. 7, arranged when lowered to aline with the other air ports described.

The connections between the exhaust passage 101 in innermost sleeve and the source of vacuum may comprise a suction tube 117 in alinement below the sleeve. An elongated rubber coupling 118 or tubing surrounds the adjoining ends of the sleeve and tube. At the foot of the tube 117 is a trap 119, and from the rear thereof extends a tube 120 leading radially to the central exhaust valve as will be further described. The trap can catch foreign matters, as oil; and a special trap is shown in Fig. 12a as later described.

The gas and air conduits of the apparatus, see Fig. 3, are supported on a bracket 124 mounted at the top of a post 125 upstanding from an extension 126 of the table 50. The conduits include a curved gas duct 128 from a suitable supply, and a curved air duct 129, from a compressor. Both fluids are under regulable pressure, for mixing for the heating flames. A curved third duct 130 also is shown carrying compressed air for cooling purposes, Figs. 3 and 7 showing a connecting pipe 131 therefrom to the manifold 110.

The gas and air connections and the burners may be in principle like those described in Patent No. 1,990,258, and will be only briefly described herein. See also Figs. 25 and 27. There is shown a pair of pipes 132 leading from ducts 128 and 129 to a chamber 133 in which the burner gas and air may be mixed, under control of valve 134. The mixture is delivered therefrom to cross ducts 135, shown in Fig. 3 as arched over the path of the traveling heads. At each side, front and back, each arched duct leads to a local manifold 136, and these in turn feed burners or nozzles 137 which may be in groups of two or more located at suitable points around the travel of the head, in accordance with the operations as described and outlined on the diagram of Fig. 1.

Head rotation and stopping

Referring next to the rotation of the head pulleys 71 from stations 5 to 13 inclusive, this is performed by the endless V-belt 37 as shown in Figs. 2 and 7. The belt engages the grooves of the pulleys and passes around a driving pulley 140 and conveniently placed idler pulleys 141. To maintain the belt taut a special idler pulley 142 is arranged on a spring-pressed swinging arm 143. The driving pulley is on a shaft 145 which may be turned by a simple gear connection as shown in Fig. 5, the lower end of the shaft carrying a bevel gear 146 engaged by a larger bevel gear 147 on the main drive shaft 56. These continuously moving parts maintain the heads in rotation from stations 5 to 13, at a speed for example of about two turns per second. Each head will remain in rotation until arrested at station 13 by the means next to be described.

The head arresting means consists primarily of a stop dog or finger 150, preferably pivoted at 151 below the turret extension or flange 63 as best seen in Fig. 6. The swinging end 72a of the finger 150 is adapted to enter the notch 72 formed in the flange of the pulley 71, and a spring 152 pulls constantly upon the finger tending to cause it to assume arresting position. The stop finger is one arm of a lever which may be a bell crank lever, its other arm 153 carrying at its front extremity a contact or roll by which the stop lever may be swung against the pull of the spring.

The turret 31 carries a head stop 150 for each of the heads, and each stop is held retracted or inoperative as its head travels around between stations 5 and 13, whereupon the stop is released and caused to bring the head to a positive arrested position and hold it locked there during the remaining operations upon the lamp. To retract the stop finger and hold it so during head rotation there is shown a fixed or passive cam or track 155 seen in Figs. 5 and 6, this having an inclined or cam entrance surface as Fig. 5 shows, and being curved therebeyond concentrically with the path of travel, so that the track first swings the arm 153 and retracts the finger and then so holds it until released as stated.

The release or unlocking of the head is thus effected by the indexing travel, preferably at a point just in advance of station 5, and Fig. 6 shows the fingers retracted at stations 12 and 13 but in stopping position at station 14. Instead however of allowing the arm or follower 153 to ride off from the track 155 for the release during travel of the stop finger and the arresting of the head, it is preferred to perform this control during the pause at station 13 by a quick or cam-controlled movement not dependent upon the indexing travel. The track 155 therefore is provided with a swinging terminal piece or switch 156 pivoted to the track at 157, this having a normal position with its inner or active edge forming a concentric continuation of the inner edge of the fixed part of the track, so that, as best seen in Fig. 6, the traveling follower arm 153 will pass on to and along the swingable terminal section without effect upon the arresting lever. When however the follower arm reaches the position shown in Fig. 6, as pertaining to the head pausing at station 13, the stop may be allowed to become operative by the outward swinging of the terminal piece from the full line to the dotted line position of Fig. 6, following which the head turns further until arrested when the notch 72 engages dog 150.

This stop release and head arresting may be under the positive control of an active cam as follows. The track piece 156 has its pivot on a vertical shaft 157, see Fig. 5, which extends downwardly to where it is oscillated at the proper point in each cycle to allow the quick swinging of each stop finger into stopping position. The vertical shaft 157 is therefore a rockshaft, and near its lower end is attached a rockarm 158 connected by a link 159 with a rocklever 160 pivoted upon a fixed stud. A second link 161 extends from the rocklever to the upper arm of a cam lever 162. The lower end of the cam lever has a follower engaged in the groove 190a of a cam 191a mounted on the main drive shaft 56. These last mentioned parts are shown in detail on the supplemental view Fig. 5a and certain of them take part in other operations later to be described.

Lamp lifting and lowering

As already stated, the lamp or bulb holder 77, carried upon the second sleeve 73, is raised near station 14 thus to lift the bulb and stretch the seal while the glass is still warm; and at a later point, namely station 29, the holder is again raised in order to stretch the heated exhaust pipe during the tipping-off and to continue the lifting of the lamp for outfeeding purposes. These holder liftings will now be described. The bulb lifting operation adjacent station 14 is shown performed by a fixed wedge or cam 165 acting underneath the disk 76 of the bulb holder as shown in Figs. 6 to 9. Thus, during the indexing movement as the head comes to station 14 the disk rides up on the first incline of the wedge, lifting the bulb and stretching the seal. The head pauses at station 14 with the disk at the apex of the wedge, while the glass hardens, the next indexing movement allowing the holder to descend again to the initial position. This simple and passive contrivance or wedge performs this stretching function. The double wedge or fixed cam 165 is mounted in any convenient manner as upon a fixed bar or bracket 166. When the holder descends beyond station 14 the lamp is held only by its exhaust pipe; but by prolonging the wedge apex the holder may remain up, even until tipping-off. The mount sleeve or stem support preferably is lowered at station 15 to make space for the operation of the defective lamp ejector, but if the ejecting operation is omitted the mount sleeve may be left elevated until station 24 to minimize heating of the coupling plug.

For the purpose of lifting the bulb holder 77 at station 29 there may be employed a finger or bar 170 which is shown in Fig. 10 as being forked to straddle the disk 76. This finger and its connections are shown in Figs. 25 and 27. It has a flared entrance between the upper and lower parts of the fork so as to facilitate the indexing movement of the head flange 76 into engagement therewith. The lifting finger 170 is mounted at the top end of a vertical rod 171 which is slidable vertically in a fixed slideway 172 at the top side of the table 50. Below the table the rod 171 is connected by link 173 with a cam lever 174 therebelow. These parts are shown in Fig. 26 which is a downward continuation of Fig. 25. The cam lever is fulcrumed on a bracket 175 depending from the table and carries a follower 176 engaging the groove 177 of a cam disk 178 mounted on the secondary drive shaft 61.

The lamp holder movements caused by cam 177 at station 29 are shown by the diagram Fig. 26ᵃ of one cycle of movement. At k the holder is in its normal or lowest position, during indexing advance which may be one-sixth of the time cycle. From k to l it is lifted, say ⅛ inch, the same as the lifting and lowering at station 14, thus to take up the clearance between holder and bulb and to support the latter during tipping-off. This occurs immediately after the indexing ceases and gives support to the lamp before the flames have softened the glass pipe. At l is a dwell long enough to ensure softening of the pipe. Then a substantial lift occurs from l to m, say ¼ inch further, enough to attenuate the softened pipe and complete the tipping-off. As later appears the flames lift with the lamp from k to l and from l to nearly m. Then is an extended lift from m to n, 3 inches more or less, which raises high the lamp for outfeeding; and, the lamp being then transferred, the holder promptly descends, as 3¾ inches from n to the initial level k. The cam 177 is designed to afford these actions in each cycle.

*Lamp coupling control*

Next will be described the means for controlling the coupling member or plug 90, normally loose about the pipe e of the lamp, but adapted to be compressed by the rising of the fifth sleeve 100 to contract the plug and cause it to grip the pipe, thus coupling the pipe with the exhaust passage 101. The mechanism has been partly described on Fig. 7, and is further shown in Figs. 11 and 12. In Fig. 12 position x corresponds with the initial or lowered position of the sleeve and the free or open condition of the plug. Position y corresponds with the partial lift of the sleeve and the coupling of the plug to the pipe. Position z corresponds to the complete lifting and closing of the plug when not occupied. It was shown that one or a pair of upstanding pins 107 is adapted to swing the arm 106 for these purposes at various stations, namely 13, 16 and 30. The pins are mounted at the top of a rocking arm 108, normally lowered as shown in Figs. 7 and 11 so as to be inoperative. The connections at station 30 will be taken as illustrative and are shown in Fig. 11. The arm 108 has a hub or collar 180 secured at the top end of a vertical rockshaft 181 which can also slide vertically as indicated by the dotted lines. The collar 180 rests upon a second collar 182 which is secured at the top end of a sleeve 183 extending vertically through a fixed bearing 184. Said bearing is part of a bracket 185 attached at the underside of the table 50. The sleeve 183 constitutes a hollow rockshaft, the shaft 181 rocking with it but being slidable vertically through it, the sliding being permitted by the provision of a pin 186 upstanding from the collar 182 and passing loosely through a hole in the collar 180, and serving to transmit the oscillating motion.

By now lifting the shaft 181 and then rocking it through sleeve 183 the pin or pins 187 will be lifted and swung, thereby to engage and operate the finger 106 and cause the closing or coupling of the plug, or its reopening, as the case may be.

These conjoint motions to afford the coupling and uncoupling operations may be produced as follows. The lifting and lowering of the shaft 181 is effected by means of a cam lever 188 having its yoked end in lifting relation to the shaft. This is fulcrumed on a bracket 187 which also is a bearing for the secondary drive shaft 61. See also Fig. 5. The lever 188 has a follower 189 engaging the face groove 190 of a cam disk 191 mounted on the shaft 61. The contour of the cam 190 determines the up and down movements, the parts being shown in their lowered position. The rocking movements of the plug-closing connections are effected through a spur gear 192 mounted upon the lower end of the sleeve 183. This gear is engaged by a curved rack 193 formed on an arm 194 fulcrumed on a stud 195 depending from the table 50, so that the swinging of the arm causes the rack to oscillate the gear and rock the sleeve. The arm 194 has at its free end a follower 196 which enters peripheral cam groove 197 in a cam disk 198 mounted upon the secondary drive shaft 61. The coordination of cams 190 and 197 afford the requisite movements of rockarm 108 and parts beyond. The coupling motion or plug squeezing is by lift of sleeve 100, but this motion is relative, and a lowering of the complementary sleeve 95 could as well be employed.

These described parts pertain particularly to station 30 at which the coupling is to be opened and the pipe cullet released. There is only one pin 187 at this station as seen in Fig. 11. Analogous mechanisms effect lifting of sleeve 100 to close the coupling at station 13, and, at station 16, when a defective lamp is to be ejected, the lowering of the sleeve to release the pipe, and its relifting to close the empty plug, in this latter case there being two pins 107 as shown in Fig. 12. On Fig. 12 the three positions of finger 106 are diagrammatically marked x, y and z. At station 13 the swinging finger is pushed from x to y to close the coupling or plug, for every head. At station 16 it is shifted first from y to x and then from x back to y and on to z, but these motions occurring only when the lamp is defective. Or, if the lamp be missing, the coupling may here be fully closed. At station 30 in all cases the finger has to be pushed from either z or y back to x, according to whether it has been shifted at station 16, thus finally to reopen the plug.

The coupling control mechanism at station 13 is analogous to that described for station 30, and on Figs. 5 and 5ᵃ appear parts 181ᵃ, 188ᵃ, 189ᵃ, 190ᵃ, 191ᵃ and 198ᵃ corresponding to the parts bearing the same numbers without the exponent. Similarly for operation at station 16, are shown the parts 181ᵇ, 188ᵇ, 191ᵇ, 198ᵇ, giving similar operation, but with a swing from position y in one direction to x and thence back in the other direction to z, the groove of cam 198ᵇ on shaft 56 having the proper contour for these motions. The coupling mechanisms for the three stations 13, 16 and 30 continue in regular action as to the swinging motion of the rockarms 108 and pins 107, and at stations 13 and 30 the lowering and lifting motions are regular for uniform operation on every lamp. At station 16, however the lifting and lowering occur only when a defective lamp is to be removed, the finger 106 otherwise remaining idle. The cam 191ᵇ therefore, for this purpose, is mounted on the third drive shaft 200 which is normally idle but is operated for a single rotation when and only when a defective lamp has been detected, a clutch being provided between shafts 56 and 200 for this purpose as will be described. No uncoupling and plug closing at station 16 are required when the leaky lamp is not to be extracted but only marked for later rejection, the detecting means in that case merely causing the action of the lamp marking or identifying means. The shutting off of the head from the vacuum is then otherwise performed, as to be described.

*Stem support lowering and lifting*

Coming now to the third or mount sleeve 85 of the stem support 87, which is to be lowered at station 15 and subsequently lifted, the connections for these operations may be as follows, referring to Figs. 5, 7 and 18. The grooved head 89 at the lower end of the sleeve 85 is shown in Fig. 7 engaged with a fixed track 90. This track consists of several portions, commencing with a high, horizontal track portion 90ᵃ, Figs. 5 and 18, which holds the mount sleeve up to its initial position. This is followed by a short gap which is occupied by a track section 90ᵇ which constitutes an elevator, positioned at station 15, on to which the sleeve head 89 passes, and by which during the station pause it is lowered to the level of the next succeeding track section 90ᶜ, say ¾ inch. The horizontal fixed section 90ᶜ extends around to station 30, where there is another gap between sections 90ᶜ and 90ᵃ, this gap being occupied by a short section or elevator 90ᵈ on to which the sleeve head 89 may pass at station 30, to be there relifted to the high level of section 90ᵃ. If the lifting and lowering of the mount sleeve were to be effected during brief indexing movements the movable or elevator sections might be replaced by inclined sections of fixed track, but the use of movable sections or elevators is preferred, permitting active cam control during the pause at each of stations 14 and 30, with better mechanical action and results. The lowering at 15 facilitates ejecting a defective lamp; if no ejection the support may remain up until reaching 24, to minimize heating, and then descend for access to the leadwires, with final relifting at 30 to initial position.

The elevators or track sections 90ᵇ and 90ᵈ by which the mount sleeve is lowered and lifted may be operated under cam control, for example as follows. As best seen in Fig. 18 the elevator 90ᵇ is mounted on a hub or block 204 secured at the top of a vertically sliding rod 205 passing down through a slideway or bearing 206 mounted at the under side of the table 50. See Fig. 5. From the lower end of the vertically sliding rod 205 is a depending link 207 connecting the rod with a cam lever 208, the lever being fulcrumed upon a depending bracket 209, so that oscillation of the lever gives the required up and down movements of the rod and elevator. The cam lever 208 carries a follower 210 which is entered into the cam groove 211 of a cam disk 212 mounted on the main drive shaft 56. The contour of the cam 211 therefore determines the lifting and lowering movements of the elevator 90ᵇ for the purposes described. At station 30 substantially analogous connections are shown, but need not de described in separate detail, Fig. 5 showing parts 205ᵃ, 208ᵃ and 212ᵃ corresponding to 205, 208 and 212, and there being a long pivot shaft 213 (seen in Fig. 33) extending between parts 205ᵃ and 208ᵃ provided on account of the separated location of parts 205ᵃ and 208ᵃ.

*Positioning of leadwires*

The device or mechanism 41 for positioning the leadwires f, prior to the tipping-off operation, by deflecting them forwardly from the glass pipe, at stations 25 and 26, and upwardly out of reach of the flames, at station 27, is illustrated on sheet 8 Figs. 20 to 24, in connection with Fig. 5 showing the underneath connections. The operation of pulling the wires frontwardly away from the glass pipe is partially illustrated diagrammatically in Fig. 23. Working at each side of the glass pipe, as seen in Figs. 20 and 21, is a deflecting finger or hook, marked 215 at one side, and 215ᵃ at the opposite side, or preferably a group of several such hooks at each side, slightly offset to afford successive actions. Fig. 23 shows substantially the motion of each individual hook or claw. After advancing rearwardly beyond the glass pipe each hook swings in substantially into contact with it. The hook end of the finger is thereby brought beyond or behind the depending leadwire f, or the two leadwires. The hook is then drawn forward, substantially in scraping relation to the pipe. Each hook extends beyond the center of the pipe, so that the co-operation of the opposite hooks ensures against the escape of the leadwire in this deflecting action.

The wire is thus engaged by the hook and drawn around to the front of the pipe. The oppositely cooperating hooks here overlap or mesh together, confining the leadwire or leadwires between them, and then pulling them substantially forward to the extent indicated by comparing the station 25 and station 26 positions of the parts in Fig. 20. For assurance of action, not only are there hooks at both sides of the pipe, but there is shown at each side a group of three hooks vertically superposed, their hook ends being out of alinement horizontally so that at each side the hooks act in sequence in pulling the wire around the pipe to a forwardly deflected position. Moreover, the three hooked fingers 215 and the three fingers 215ᵃ are arranged out of vertical alinement, namely at alternating levels, as shown in Fig. 21, by suitably arranged washers on their pivots, so that the three fingers of one group can overlap and mesh with those of the other group during the wire-engaging and deflecting movements. To make further sure that the leadwires will be engaged and deflected away from the pipe, the entire deflecting devices, comprising the opposed groups of hooked fingers, are duplicated at the successive stations 25 and 26. It will be noted that while the duplicate hook or claw devices work in parallelism, the radius of each head swings through a substantial angle, as 12°, between stations 25 and 26; so that relatively the devices work at different angles, and a wire that might be in a position behind the exhaust tube to be missed at station 25 will be engaged, caught and pulled frontward at station 26.

When thus deflected the wires will stand at the frontwardly extending position appearing in dotted lines at station 26, shown also in full lines at station 27 and in dotted lines in Fig. 24. Following this forward deflecting of the wires they are preferably bent upwardly by a separate device acting at station 27 as shown in Figs. 20 and 24, as will be described.

The group of hooked fingers 215 is shown mounted on a swinging carrier 216 while the opposite group 215ᵃ is mounted on an opposite carrier 216ᵃ, each of these carriers having horizontal ears between which the fingers are pivoted by a vertical pivot pin and separated by washers serving to position them at the alternate levels as shown in Fig. 21. A system of small back springs 217 is employed, with individual spring parts pressing outwardly on the extending tails of the respective fingers, so that each finger is individually pressed inwardly towards its wire engaging position, this movement being limited by short heels or stops 218 extending rearwardly from the swinging carriers. Each carrier then with its group of fingers and controlling springs constitutes an entity, and it remains to describe the movements and mountings of each pair of carriers.

The two hook carriers 216 and 216ᵃ are both mounted scissor-fashion on a vertical pivot pin or stud 219 extending upwardly from a support or block 220 mounted as will be described. The carrier 216 has a frontwardly extended tail 221 with a curved or cam contour, while the carrier 216ᵃ has a similar extending tail 221ᵃ. By these opposing tails the swinging movements of the carrier are effected, the tails being forced or cammed apart to thrust apart the carriers and fingers, while a cross spring 222 connects the carriers, operating to draw them together when permitted. To limit and determine the inwardly swung positions of the carriers, each of them is provided with a stop screw 223 having adjustable engagement with a central stop stud 224 upstanding from the support 220. When the carriers are not held apart by the means later to be described they are thus pulled together by the spring 222 toward the hook-engaging position shown in dotted lines at station 26, this being their position during their forward retraction (to the right in Figs. 20 and 21) the carriers being swung apart for their rearward (leftward) advance as shown at station 25.

The further mountings and connections of the leadwire hook carrying parts may be for example as now described. The carrier support or block 220 is formed or mounted on top of a transverse bracket 226, or an opposite pair of such brackets, projecting right and left from an advancing and retracting carriage 227. This carriage is shown in the form of a sliding plate moving horizontally in a slideway 228 mounted atop a standard 229 upstanding from the table 50. The carriage 227 is fitted into the slideway 228 and there confined by opposite cover plates 230. It is desirable that the carriage be held under frictional pressure in its slideway so that it will tend to hold its advanced or retracted position. For this purpose under the lefthand cover plate 230 is shown a gib 231 which is caused to press against the carriage by transverse pins 232 externally engaged by a plate spring 233 placed under pressure by a nut 234.

As each head and lamp arrives at station 25, and again at station 26, it is desirable to have the wire deflecting mechanism advance rearwardly, with the hook fingers retracted, into the full line position shown in Fig. 20, whereupon the fingers and carriers are to be caused to swing toward each other for the wire engaging movement and then retracted forwardly to the dotted line position shown in Fig. 20. This four-motion movement of the carriage 227 and the finger mechanism thereon may be effected as follows. Above and adjacent to the carriage slide is shown an actuating member or bar 235 capable of sliding relatively upon the carriage, and enclosed therewith beneath the cover plates 230. The top of the carriage is longitudinally recessed to receive and permit relative sliding of the actuator bar thereon. The carriage at each end is shown as having an adjustable contact screw 236 mounted in an end plate 237, these screws being in position to contact the ends of the actuator slide 235 as it is moved rearwardly and frontwardly on the carriage. The screws are spaced further than the length of the bar. With this arrangement it is only necessary to thrust the actuator bar rearwardly, that is to the left in Fig. 20, until it contacts the screw 236 at that end, the continued movement of the actuator causing the advance of the carriage to the full line position; whereafter the retracting or forward movement of the actuator causes it first to slide to the front end of the carriage, contacting the screw 236 at that end, the continued movement of the actuator moving the carriage frontwardly to its retracted position indicated by the dotted lines in Figs. 20, 21 and 22. The initial bar movement is to cause the swinging of the hook carriers 216, 216ᵃ as will be described, followed by the bodily advance or retraction of the carriage and carriers as already described.

To produce the described fore-and-aft movements of the actuator 235 for actuating the carriage and the finger mechanism the following timed connections may be employed. On top of the actuator is shown a longitudinal block 239 and upstanding from said block is a pin 240. The pin 240 is engaged in the slotted swinging end of an actuating lever 241 fulcrumed upon a bracket 242 outstanding rightwardly from the slideway 228. In order to swing the lever 241 it is attached to a vertical rockshaft 243, which appears in Figs. 20 and 21 and as well in the lower left part of Fig. 5. At its lower end the rockshaft 243 passes through a combined bracket and bearing 245, Fig. 22, and at its lower end, below the table 50, it carries a bevel gear 246 which is engaged by a bevel rack 247 formed on a lever or bell crank 248 which is fulcrumed on a bracket 245. The lever 248 is a cam lever having a follower 249 engaging the cam groove 250 of a cam disk 251 mounted on the secondary drive shaft 61. The timing therefor of the cam 250 determines the rocking movements of the vertical shaft 243, and from this all of the described motions of the finger carriage and fingers are effected.

The swinging of the finger carriers from and toward each other may be simply effected by means of a wedging or camming pin 255 mounted near each end of a cross piece 256 attached to the block 239 of the actuator 235. During the first part of the advancing movement of the actuator the pin 255 enters between the tail pieces of the two carriers, as Figs. 20 and 21 show, spreading them apart and thus separating the fingers, this action being completed before the continuing advance of the actuator causes the carriage and fingers to advance bodily to the operative position shown in full lines. The relative retracting of the actuator on the other hand first withdraws the spreading pin 255 from the carrier extensions and thus permits the carriers and fingers to close in toward each other before the actuator has engaged the contact 236 at the front end of the carriage for producing the bodily retracting movement of the finger mechanism.

The depending leadwires having thus been engaged and deflected forwardly to the dotted line position shown in Figs. 20 and 24, it is desired to supplement such deflecting by an upbending of the wires, and this is shown accomplished as follows. In Fig. 20 at station 27, and in Fig. 24, is shown a wire-upbending bar or finger 260. This is normally lowered, but while each head pauses at station 27 the upbender is lifted from the dotted line to the full line position shown in Fig. 24, thus bending up the leadwires as desired. The upbending member or bar 260 is shown mounted on a carrying arm 261. These parts are seen also in Figs. 25 and 27 where the arm 261 is shown as mounted on a collar 262 attached to a rising and falling part 271 of the tipping-off mechanism later to be described, actuated by cam 177 already described.

Tipping-off

The tipping-off mechanism 43, shown mainly in Figs. 25 to 27, has been partly described, including the burners 137 for concentrating flames on the glass pipe e, the finger or lifter 170 to raise the lamp during the tipping-off, the hub 169 carrying the finger, mounted atop the vertical rod 171, and the cam lever 174 moving the rod up and down as controlled by the cam or groove 177 in the disk 178 on the secondary drive shaft 61.

This control cam 177 was described in connection with the diagram thereof Fig. 26a, showing that the finger 170, and the bulb holder 77 moved by it, have first a short lifting movement from k to l to offset the drop of holder and lamp occurring at station 14 after the stretching of the seal; followed by a longer lift from l to m to stretch the exhaust pipe during the tipping-off; followed again by an extended lift to raise the lamp to the outfeeding position. It should be here stated that the small lift from k to l is only necessary to give steadying support to the lamp before the flames soften the exhaust pipe by which the lamp is supported when it comes to station 29. When the holder and bulb are lifted at station 14, by the rise of the wedge 165, they might be held in this raised position around from station 14 to 29, whether by a continuous track similar to track 90 or 155, or by a latch or otherwise. The essential lifting movements are the short lift at station 14 to stretch the seal between bulb and skirt, and the lift from l to m at station 29 to stretch the pipe and complete the tipping-off; these being herein supplemented by the quickly following rise from m to n for outfeeding purposes.

Referring to the further details at Figs. 25 and 27, at the top of the vertical rod 171 is mounted a horizontal plate or shelf 270 on which are carried certain parts. At the left end of the rising shelf 270 is a vertical boss 271, attached to which is the collar 262 mentioned in connection with the leadwire positioning mechanism. Within the boss 271 is mounted a vertical rockshaft 272 having upper and lower rockarms 273 and 280.

The upper rockarm 273 extends rightwardly and at its free end, by a pivot stud 274, carries a shield 275, in the nature of a pair of metal plates adapted to swing in above the tipping-off flame, thus to protect the lamp and leadwires from the heat. The two shield plates, pivoted at 274, have extensions 276 beyond the pivot connected by a spring 277, acting to press toward each other the operative ends of the plates. The two shield plates are formed with nicks 278 together forming an aperture to receive the glass pipe e. When the rockarm 273 is swung inwardly the shield plates, with inclined ends, pass at each side of the glass pipe, coming to rest with the pipe snapped into the aperture 278. Preferably the shield is mounted on the rockarm for equalizing movement or loose play both endwise and swingingly, so as readily to adapt itself to variations in position of the pipe.

The shifting of the shield plate 275 into and from shielding position is shown as effected by a lower rockarm 280, in the form of a cam plate attached at the lower end of the rockshaft 272. The cam plate 280 is located at the level of the cylindrical portions 70 of the heads, as they come into position. As will be clear from Fig. 27, as each head comes to position it acts first against the rise 281 of the contour of the cam 280, swinging the shield outwardly to retracted position, and as the head comes to station 29 it moves along the complementary contour 282 of the cam, allowing a quick swinging back of the shield into shielding position. In order to hold the cam toward the traveling heads the rockshaft 272 is provided with a projecting pin 283 connected by a spring 284 with a post 285 on the shelf 270. The advanced or inward position of the shield may be limited by the following device. Attached to the cam plate 280 is a bar 287, having its outer end bent upwardly and provided with a stop screw 288 arranged to contact a cooperating stop lug 289 at the under side of the shelf 270. This stop is so adjusted that when the heads are not traveling the cam 280 will clear the two adjacent heads, as Fig. 27 shows, thus preventing any conflict while the cam is undergoing vertical movements.

As already stated, it is desirable that the flames at station 29 shall rise with the lifting of the lamp, so as to concentrate the heat at a predetermined point on the rising portion of the glass pipe e. Taking part in this operation is a rightwardly projecting arm 291 on the rising hub 169, this carrying a vertical stop screw 292 arranged to control the lifting movement of the burners, their manifold etc. Adjacent to the vertical rod 171 is another vertical rod 295 carrying at its top end a hub 295 which constitutes the support for the burner manifolds at this station. The rod slides vertically through a bearing 297 mounted atop the table 50. Instead of separate lifting connections for these parts there is shown, in the lower part of the bearing 297 a lifting spring 298 pressing upwardly on the flame-carrying parts. Somewhat below the top end of the rod 296 is a collar 300 fixed thereon, and outstanding from this collar is a front lug 301 which is forked. This lug at its left side carries an extension or finger 302 which operates beneath and in contact with the stop screw 292 that rises with the rod 171. The spring 298 thus normally holds the flame-carrying parts up, with extension 302 contacting stop screw 292, so that the flames will rise with the lifting of the lamp. This rise of the burners for tipping-off however should not continue for the full lift of the lamp and stop means to prevent excess rise are provided as follows. The front lug 301 of the rod 296 straddles a fixed guide rod 303 secured in a boss 304. Near the top end of the short rod 303 is fixed a collar 306, the rear side of which projects outwardly and carries a stop screw 307 adapted to be contacted by the top side of the lug 301, thus to afford an adjustable final limit to the rising movement of the burners.

By these means the cam 177 causes the lifting of the lamp and the flames from level *l* to *m* shown in Fig. 26ᵃ, the burners being stopped at or slightly below this level and the continued cam action lifting the lamp from *m* to *n* for outfeeding purposes. A safety device 310 is shown in the nature of a finger or plate projecting rightwardly from the extremity of the finger 170. This safety finger 310 is arranged to overlie the top of the disks 75 of the heads which are pausing at stations 29 and 30, thus insuring that the disks 75 and the lamp holders connected with them shall descend to normal position and remain there during the cullet extracting operations.

*Outfeeding*

The completed lamp is shown as being outfed or delivered from the head at the same station with the tipping-off operation, namely station 29, although the mechanism to be described could also, but to less advantage, give the final or outfeeding lift at a succeeding station. The outfeeding may be first outlined by reference to the partial showing on Figs. 25 to 27, the details being shown in Figs. 28 to 31.

The outfeeding device is in the nature of a chuck or clutch arranged to engage and grip the lamp by its bulb portion and carry it frontwardly from above the head. As Figs. 25 and 27 show the outfeeding chuck consists of three or more fingers 313, spaced around the bulb at suitable points cooperating with a top chuck part or stop 332 which also subsequently operates as an ejector of the lamp. The chuck fingers 313 are pressed inwardly by springs 314 shown in Figs. 28 and 29. The chuck is so positioned, above the head at station 29, that when the lamp is lifted from its full line to its dotted line position in Fig. 25 it is caused to wedge its way between the spring fingers 313 and thus snap itself into the chuck with its extreme top accommodated in the concave under side of the chuck stop part 332. This is brought about by the cam 177 shown developed in Fig. 26ᵃ, the lifting from level *l* to *m* cooperating with the tipping-off action, while the subsequent lifting from level *m* to *n* operating to raise the head and lamp to engage the lamp in the outfeeding chuck as stated. The three chuck fingers 313 are so disposed as to pass between the lamp-supporting projections 76 of the lamp holding ring 77 of the head, thus avoiding conflict therewith. This lifting motion from *m* to *n* thus transfers the lamp from the head to the outfeeding chuck, and the lamp holder then immediately descends from *n* to *k*, leaving the lamp in its delivered position. This transfer of lamp from the head to the outfeeding chuck is followed by the frontward swinging of the chuck along an arc as indicated by path lines in Fig. 27, this motion bringing the lamp in relation to any convenient receiving point such as a chute 355 to be described.

Referring now to the details of the outfeeding mechanism, the three spring fingers 313 are normally pressed inwardly by the compression springs 314 pressing the upward extensions of the fingers outwardly against adjustable or screw stops 315 on the body portion 316 of the chuck. The chuck body is generally circular but has three pairs of outstanding ears 317 between which the fingers are pivotally mounted. The chuck has an upstanding shank 318 removably engaged and secured by set screw in a circular block or boss 319 formed at the swinging extremity of a long lever 320. The chuck lever 320 may swing about an axis substantially in front of station 27 while its free or chuck end swings from a point directly over the head at station 29 and therefrom frontwardly to a discharge point as indicated by the dotted lines in Fig. 27.

The outfeeding chuck lever 320 is shown as formed with a split hub 321 adapted to be tightened by a clamp screw 322 and having a groove to engage a spline 323 on a vertical rockshaft 324 by the rocking of which the lever is oscillated as described. The rockshaft 324 is shown as mounted to revolve within a pedestal or bearing 325 located on top of the machine table 50. At its lower end the shaft carries a rockarm 326, below the table 50, the arm carrying a follower 327 which is entered into the cam groove 328 of a cam disk 329 mounted on the secondary drive shaft 61. These parts 324 to 329 are shown also in Fig. 5, which indicates the contour of the cam, its groove being such as to cause the chuck to swing rearwardly and pause above station 29 in time to receive the lamp lifted therefrom, and, after the descent of the lamp holder, to swing frontwardly to ejecting or discharge position.

The lamp outfeeding chuck comprises also an ejector 332 adapted to bear against the top end of the lamp and to press it down for thrusting the lamp from the chuck. With the form of chuck fingers shown, having simple contact with the lamp bulb, the ejector constitutes an active part of the chuck itself as well as the ejector. The ejector 332 is mounted on a sliding shank or rod 333. This shank near its threaded top end carries adjustably a grooved nut 334 held in position by a lock nut 335. A fork 336 on a lever 337 has pins entering the grooved nut 334, so that the swinging of the lever lowers and lifts the ejector.

The ejector lever 337 has its fulcrum 338 on an upward extension or lug of the chuck lever 320, and beyond the fulcrum the lever has an operating extension 339 carrying a stud or roller 340 at its extremity. A spring is arranged between the chuck lever 320 and the ejector lever extension 339, tending to lower the latter and thus retract upwardly the ejector. This spring-pulled motion is limited by a screw contact 343 mounted on the ejector lever and adapted to contact with an extension or block 344 on the chuck lever.

For the purpose of methodically lowering the ejector at the discharge point the following automatic connections are shown cooperating with the stud 340 on the ejector lever. In effecting the ejecting movement advantage is taken of the bodily swinging of the chuck. For this purpose a cam plate 346 is mounted in fixed position at the top end of a vertical rod 347, as shown in Figs. 28 and 29, this fixed cam having an inclined surface along which the stud 340 moves upwardly during the outswinging of the chuck. This motion progressively lowers the ejector, and the motion is timed so that the lamp will be discharged as it reaches the receiving place or chute.

For close adjustment of the ejecting operation the rod 347 carrying cam 346 is shown as vertically slidable through a boss 348 extending forwardly from the pedestal or bearing 325, with a set screw 349 to hold the rod and cam at their proper elevation.

The operation of these parts is as indicated, the chuck receiving the lifted lamp at station 29 and then swinging frontwardly to the discharge position, the ejector cam 346 coming into action at the latter part of this swing, causing the ejector to thrust the lamp downwardly until it snaps out of the chuck. A useful adjunct in this outfeeding movement is a lamp tilting means or device, for ensuring that the discharge will not endanger the tipped-off tube, and shown in the nature of a fixed bar or hurdle 352 positioned in the path of the neck of the lamp, as shown in Figs. 27 and 30. This lamp tilter may consist of a piece of rubber tubing mounted upon a core 353 which may be a metal rod suitably bent into the proper tilting position and at its lower end mounted, for example upon the table 50. As the chuck and lamp swing forwardly the lamp is met by obstruction or tilter 352, and to hurdle the same is compelled to tilt in the manner shown in Fig. 30, wherein the chuck is travelling toward the right. When the lamp has passed the device 352 it has been tilted almost to horizontal position, and this action protects the delicate tipped-off extremity of the glass pipe e. Carrying the motion further the lamp, so tilted, is brought between the sides of the chute 355, with safety to the pipe e, Fig. 31 showing substantially the position of the lamp as it enters the chute, and its subsequent position after ejection, resting safely in the chute down which it slides to a suitable receiving point. Various kinds of devices may be employed to receive the lamps successively ejected from the described chuck. For example the tilter 352 could be omitted, and each lamp merely forced vertically downward into receiving sockets provided in an endless conveying belt, by which the lamps are carried away to a convenient receiving point where they may be removed by hand or automatically, or for that matter transferred into the successive heads of a finishing or basing machine such as that shown in patent of C. B. Palucki No. 2,069,386, issued Feb. 2, 1937.

*Cullet extracting*

At station 30 is shown a mechanism for removing from each head the remaining fragments of lamp bulb skirt and exhaust pipe. This operation is substantially necessary for an automatic machine, in order to clear the head of these glass cullets without manual attention, and without danger of breakage, so that at the following stations the head will be in readiness to receive the new lamp parts, bulb and stem. The pipe cullet still remains gripped in the coupling plug 99 while the skirt cullet still remains surrounding the stem support 86, 87, which however has been lowered, at or subsequent to station 15, so that the cullet rests substantially upon the lower disk 75 of the bulb holding frame. The principle of the extracting mechanism is the provision of extractors which reach in from the front, engage, lift and retract with the cullets, for their discharge. See Figs. 32 to 35 taken with Figs. 5, 6 and 7.

In Figs. 6 and 33 is shown a small upward projection or button 79 on the disk 75 of the head, this standing in such front position as seen at station 14 in Fig. 6 as to receive the lower edge of the skirt cullet when the stem support is lowered, thus holding the cullet raised slightly above the disk surface, providing a clearance for the reaching in of the extractor. The skirt cullet extractor 360 is shown as a plate of fork shape, its two sides clearing the parts between and sliding under the cullet at each side of the head sleeves so that it can engage under and lift the cullet as does a kitchen utensil lift a pancake. The extractor for the pipe cullet consists of a pair of gripping jaws 407 on the left and 408 on the right, the latter relatively swingable to open and close the jaws under proper coordination. These two extractors are preferably mounted upon and actuated by a common mechanism as will now be described.

The skirt cullet extractor 360 is shown as having a bent shank 361, extending upwardly and then frontwardly, the front portion clamped within a built-up carrier or block 362 which serves also to hold the pipe extractor as will be explained. The carrier or block 362 is mounted at the rear end of a carrier bar or slide 363, the left face of which is formed with rack teeth 364 for the transmission of fore-and-aft reciprocation. The front end of the bar 363, being its right end in Figs. 32 and 33, is mounted slidably in a way 365, passing completely through the slideway to the front thereof, the bar there carrying an upstanding bracket 366 of inverted L-shape.

The extractor carrier bar 363 is confined in its slideway 365 by a cover plate 367 on the latter. The slideway is mounted for rising and falling movements, having an underneath boss 368 attached at the top of a sliding vertical shank 369 mounted in a fixed slideway 370 on the machine table 50. For effecting the up and down movements of the slideway 365 and extractor system carried by it the vertical shank 369 is formed with a horizontal slot 371 near its lower end, this slot being engaged by a stud or roller 372 mounted at the front end of a lever arm 373, so that the swinging of the lever causes the lifting and lowering of the slideway. The lever is fulcrumed at 374 on a fixed bracket 375 depending from the table 50, and to the rear of the fulcrum the lever has a cam arm 376 at the end of which is a follower 377 entered into the cam groove 378 on the face of a cam disk 379 on the drive shaft 61. These parts 369 to 379 are seen in top view in Fig. 5 wherein the lever fulcrum 374 is seen to be a rockshaft of extended length owing to the spacing of the cam disk 379 from the vertical sliding shank 369. From this description it will be understood that the contour of the cam 379 determines the lifting and lowering movements of the cullet extractor system.

The rearward movement of the extractors toward each head and their return frontward movement may be effected by the sliding of the carrier bar 363 in the slideway 365 as follows. The rack teeth 364 on the side of the sliding bar are shown engaged by a gear 382 confined within a leftward offset 381 of the slideway 365. This gear is mounted at the top end of a vertical shaft 383 which extends through a top bearing 384 at the under side of the slideway and a lower bearing 385 located at the lower end of the shank 369, these parts rising and falling with the slideway. Near the lower end of the vertical shaft 383 is an elongated gear 386. This gear is engaged at all times by a rack 387 mounted at the front end of a rockarm 388, fulcrumed on a boss 389 below the machine shelf 50. The rockarm 388 is part of a lever having a rear arm 390 carrying at its extremity a follower 391 entered in the peripheral cam groove 392 of a cam disk 393 on the drive shaft 61. The contour of the cam 392 is seen in Fig. 5 and is such as to cause the rearward and frontward movements of the extractor system in coordination with the lifting and lowering movements thereof. When the extractors have engaged the cullets they are lifted bodily and then moved bodily frontward away from the head, where the cullets are discharged, these movements being reversed to return the parts for the next head, the lowering preceding the advancing on the return so that extractor 360 slides in under the skirt cullet.

In order to discharge the skirt cullet from its extractor blade 360 in its retracted front position the following contrivance may be used. A stripping finger or blade 395 is operated as indicated by comparing Figs. 33 and 35 to eject the cullet into a chute. The stripper or ejector 395 is in the form of a depending plate or blade attached to a sliding shank 396 mounted in the head 362 in a position directly above the extractor 360. The shank 396 is attached to a frontwardly extending slide rod 397, the extreme front end of which slides in the front bracket 366 of the carrier bar 363, as Figs. 32 and 33 show. The relative ejecting and return movements of these parts is shown as effected as follows. On the slide rod 397 is attached a collar 398 constituting a back stop. A spring 399 extends from the collar to a pin atop the bracket 366, thus pulling the rod relatively forward. On the rod is a second or front stop 400 shown engaged against the bracket 366, constituting its normal position. On top of the slideway 365 is shown a relatively fixed stop 401 upon the top of which the rod 397 slides and against which the rear collar 398 is adapted to contact. By this arrangement of parts, when the carrier bar 363 retracts with the skirt cullet, the collar 398 will, at the proper time, abut against the stop 401, preventing further retracting movement of the rod, while the bar continues frontward. The result is a relative rearward movement of the rod, causing the ejector to move rearward over the extractor. This position is shown in full lines in Fig. 35, the ejector having brushed or stripped the cullet from the extractor. At the same time, as will be described, the pipe cullet is released, and the two cullets are thus dumped, in each cycle, into a receptacle or chute 403 by which they are disposed of.

By these means the coordinated cams 379 and 392 bring about all of the necessary movements of the skirt cullet extractor and the cooperating ejector; and as will next be described the pipe cullet extractor also is actuated solely from the same connections.

The pipe cullet extractor is shown in Figs. 32 to 34 as consisting of the relatively fixed jaw 407 and swinging jaw 408. The fixed or left hand jaw is attached by screws 406 to the carrier or block 362, as shown also in Fig. 35. The swinging jaw 408 is shown mounted on a fulcrum stud 409 on top of the block 362. The jaw is made up of the pipe engaging part 408 and a pressure member 410 adjacent to it, with a stop screw 411 between them and a spring 412 holding 408 yieldingly away from 410. The member 410 has an extension or tail 413 beyond the fulcrum. By swinging the extension 413 the jaw 408 is opened or closed, with a resilient yielding action. To effect such swinging the extension 413 is shown connected by a link 414 with a longitudinal slide 415 mounted in a part of the block or carrier 362. The sliding of this slide operates the link and connected parts. The slide 415 is held frictionally against undesired movement by a spring button 416 bearing upon its upper side. The actuation of the slide 415 and connected parts is effected by a connected slide rod 417 shown in Figs. 32 and 34. This rod has a back stop 418 and a front stop 419, both cooperating with a relatively fixed stop 420 upstanding from the main slideway 365. These devices effect the necessary jaw movements. When the carrier bar 363 has advanced toward the rear as in Fig. 32 the stop 419 has contacted stop 420 and caused rod 417 to retract relatively frontward, closing the jaws as seen in Fig. 32 at the end of the advancing movement of the extractor system. On the other hand when the carrier rod 363 has been lifted and is retracting frontwardly the stop 418 will eventually strike the fixed stop 420 as seen in Fig. 34, the final movement causing rod 417 to move relatively rearward, thus acting through the link to swing open the jaw 408 and discharge the pipe cullet into the chute 403.

*Exhausting and filling*

For the exhausting or gas filling of each lamp, including flushing, there has been described in connection with Fig. 7 and others certain of the passages and connections from the glass exhaust tube e of the lamp, this being occupied by plug 99 to the vertical sleeve 100 containing the exhaust passage 101 and the lower end of which is coupled by a rubber coupling 116 to a pipe 117 as of glass from which extends radially inward the tube 120 leading toward the control valve 425 centrally located. The further details appear in Figs. 3, 4 and 36 to 40.

As already described the treatment may comprise a preliminary or test exhausting of each lamp at station 15, as shown on the diagram Fig. 1, and, after the detection of a leaky lamp at station 16, a reexhausting at station 17. The operations at stations 15 and 17 may be by a special source of preliminary vacuum. Thereafter beginning with station 18 commences the usual series of exhausting operations, either continued to the tipping-off point, or alternated with gas flushing operations and a final gas filling ahead of station 29 before the tipping-off.

The central valve 425 comprises relatively movable sections, preferably an upper section or disk 426 and a lower section or seat 427, the upper section connected with the turret and therefore rotating or indexing with the step-by-step movements of the turret. In the several figures the exhaust tube 120 extending from each head is shown as connected by a flexible coupling 428 with a metal tube 429 extended radially inward and gas-tightly threaded and connected with the upper or rotatable section 426 of the valve. Each head tube 120 and its extension 429 deliver into a short vertical valve passage or port 430 formed within the rotary valve section and extending to its under surface for controlled connection to the ports and passages in the stationary valve section below, as will be further described. The seat has various kinds of ports, also in circular series, to register with the successive disk ports.

The upper valve disk or section 426 is not attached directly to the turret but is shown driven therefrom as follows. A pair of opposite studs 433 depend into recesses in the disk as shown in Figs. 3, 36 and 37, these being attached below a bridge or bar 434 which extends beyond at each end and is fixed at the top of vertical posts 435 mounted on the turret. In this way the rotary valve disk is intermittently turned or indexed along with the travel of the heads, so that each of the thirty valve ports 430 is brought successively to the various ports in the fixed valve section as will be described. These various ports are active from station 15 around to a point between stations 28 and 29, while the heads traveling from station 29 around through the sealing-in range of travel and back to station 15 partake in no exhausting or filling operations. Instead, the valve section 427 may have a continuous annular groove or chamber 437 with which the ports 430 communicate from station 30 around to station 14, and the chamber or channel 437 may have a relief opening to the atmosphere or elsewhere.

Coming now to the structure of the central valve 425, this is shown as containing a vacuum chamber 438 of substantial size in the fixed or lower valve section or seat which connects with certain peripheral seat ports. An upward extension 439 of this chamber may reach to the top of the valve seat as shown, so that the central part of the rotary valve disk will be subjected to the vacuum, thus insuring the tight coupling of the valve parts during rotation. The valve seat portion is formed below with a boss or neck 440 within which is threaded a nut 441, confining packing material above it including a rubber washer above a steel washer and thus constituting a stuffing box. At opposite sides the nut may have engageable extensions 442 for tightening it in place. These parts surround a vacuum tube 443, by which the chamber 438 is thus coupled to a suitable pump which maintains a high vacuum in the valve.

As will be further described, there are shown two sources of vacuum, a preliminary vacuum, which is a high vacuum, for example of 150 microns, and a final vacuum which may be still higher, as 20 microns pressure. The tube 443 leads to the final vacuum pump. As will be clear from Figs. 1 and 36 final vacuum is communicated to the heads at each of stations 18 to 28, this being accomplished by a series of short passages or ports 445 in the valve seat, communicating from the vacuum chamber 438 to the ports 430 pertaining to the respective heads as they come to position. This is brought about by the successive indexing movements, the fixed and movable ports coming into mutual register at each station, although being cut off during the indexing travel between stations.

Referring now to the seat ports other than vacuum ports 445, these are in concentric line with ports 445 but have peripheral connections, as next described. The preliminary vacuum is applied to each head as it comes to station 15 and again at station 17 as indicated in Figs. 1 and 36. This connection is by short passages or ports 448 located at these two stations as shown also in Fig. 37, each of these ports being connected by a tube or connection 449 to the source of preliminary vacuum, or auxiliary vacuum pump.

The partial flushing which is effected between stations, during indexing movement, beyond station 20 and up to station 28, may be effected by the provision of eight flushing passages or ports 452 shown in Figs. 36 and 39, each of these having a reduced terminal so that the traveling ports 430 may not at the same time make connection with a vacuum port 445 and a flushing port 452. The several ports 452 are shown as leading from an annular chamber 453 in the nature of a manifold, this being exteriorly closed by a strip 454, at a convenient point of which is provided a flushing tube or connection 455, shown in Fig. 37. The flushing tube 455 may be supplied, as by nitrogen gas, from a suitable supply tank, preferably through a purifier as is usual.

When the lamps are to be gas-filled the connections therefor may be as follows, see Figs. 36 and 40. A single valve seat port 457 is provided, similar to the ports 452, delivering the gas to the traveling ports 430 at a point between stations 28 and 29, just before the tipping-off. The port 457 is shown supplied by a gas tube 458 leading from a suitable supply of gas as nitrogen or argon, which may be below atmospheric pressure.

For leak detection the seat may have a port 470 between exhaust ports 448, see Figs. 4 and 36.

This substantially completes the description of the central valve 425. Protection against air leak between the fixed valve seat and the traveling disk is shown in the nature of complementary shallow channels 460 in the two valve parts, these being concentric, one of them near the outer rim of the valve, and the other between the various ports and the chamber extension 439. The channels 460 may be occupied by oil, forming a liquid gasket, and this oil may be maintained in constant flow by the means indicated in Figs. 36 and 38. A horizontal radial passage 461 is shown with connections to both of the channels 460. Upwardly from the channel 461 is shown a connection and tube 462 which may be considered the oil exit. The oil may be supplied by an underneath passage 463 in the valve seat, an oil tube 464 being indicated, which may lead from a source of oil, such as an elevated tank affording head and constant oil progress through the system.

*Leak detecting*

The means for detecting leaking lamps is positioned at station 16 and may control a means either to mark each defective lamp for later rejection or means for actually ejecting the defective lamp at station 16. When a lamp is leaky or to be ejected, naturally the head should be isolated, and the exhausing connections to the head must be tightly closed against admission of air, and this may be effected by the tight closing of the rubber plug coupling 99 as already outlined when the lamp is ejected. On the other hand the closing off of the head from the vacuum connections may be effected otherwise, as by the modified construction shown in Fig. 12ª and partly indicated in Fig. 4. It will be convenient first to describe this modified construction.

The fifth sleeve or exhausting tube 100 shown in Fig. 7 is represented by corresponding tube 100ª in Fig. 12ª. This is shown coupled with the continuation tube 117ª below, but in this modification by an elongated rubber coupling or tube 118ª. This is so long that its extent between the two tubes is capable of being pressed or pinched to a tight closed condition, and a device or pincher 116 is indicated for that purpose. The closing of the pincher 116 may be effected automatically prior to the extraction of each defective lamp. This modification is indicated also in the diagram Fig. 4.

Fig. 12ª shows also the modification of the moisture trap 119 of Fig. 7. The moisture trap 119ª is composed of metal. The tube 117ª enters the trap at a midway point while the tube 120ª leaves at a high point extending to the central valve 425. Within the trap 119ª is shown a cylindrical mesh or screen 121 through which air must pass toward the exit. Near the bottom is an internal trap-closing plug 122 made for example of rubber, and readily removable when relaxed. The trap is sealed by means of a bolt 123 having its head above the rubber plug and its lower end passing through a cap or washer 123ª, so that when the plug is inserted and the bolt nut is tightened the plug will be compressed against the bolt and against the trap wall, thus sealing the trap. Foreign matters entering the trap and collecting below the screen may thus be readily removed at convenient intervals.

Coming now to the leak detecting means, this is shown as commencing with a port 470 in the central valve seat, shown in Fig. 36 as positioned at station 16, this being substantially similar to the ports 448 already described. Fig. 4 shows the registry of ports 430 and 470, the latter having connected to it an exhaust tube 471, which branches into a tube 472 and a tube 499. The tube 472 extends to a hydraulic detector of pressure variations, shown in the form of a manometer or mercury-filled U-tube 473. The U-tube is shown as having mercury 474 at equal level in its two legs. The open leg connects with tube 472, while the closed leg contains a variable vacuum space 475 above the mercury. These parts are shown on an enlarged scale in Fig. 4ª, which also shows a pair of conducting wires 477 extending down through the closed end of the tube to a point normally above the mercury level. The wires are spaced apart and provide a break in a circuit, normally open, but adapted to be closed by the rise of the mercury in the case of a rise of pressure in the tube 472 by reason of inflow of air through a leaky lamp. The space 475 is preferably wholly free of gas, and when the tube 472 is at high vacuum the mercury will stand at substantially equal levels in the two legs. This constitutes a very delicate and quick acting detector, the mercury rising within the closed leg immediately upon the inflow of air through the leaky lamp, thus closing the circuit of the wires 477.

Describing now the detector circuits, a pair of line wires 480 is shown energizing a transformer 481. This for example may transform 220 volts alternating current to 12 volts in the operating circuit. From the transformer extends a wire 482 to a relay magnet 483, with a manual switch 484 to permit opening of circuit when desired. From the relay extends wire 485 to one of the manometer wires 477, the other thereof being connected by wire 486 with a suitable make and break device 487 or master switch adapted to be closed and opened in proper timing in each cycle of the machine. The switch 487 is shown as a mercury switch, being mounted upon a lever arm 488 by which it may be tilted to the open position shown in Fig. 4 or tilted back to a closed position; these operations being shown performed by a cam 489 mounted on the drive shaft 56, as shown also in Fig. 5, the cam having a dwell for each position of the switch and being shown substantially in that position at which the turret has just completed its indexing movement, so that after a suitable pause the switch 487 will be closed and the detecting circuit rendered operative for the extent of the second dwell. From the master switch 487 extends a wire 490 back to the transformer, thus completing the main circuit.

If a perfect lamp is in the head pausing at 16 there will be no operation of the circuit for the reason that the high vacuum in tube 472 will hold the mercury in its normal position shown. On the other hand if the lamp is leaky, admitting air, this air will pass through the exhausting tube 100 of the head and thence through pipe 120 to the port 430 in the rotary valve disk 426, and thence by tubes 471 and 472 to the manometer, thus displacing the mercury, closing the main detecting circuit and operating the relay 483. This relay is shown as comprising a relay armature 492, forming part of a circuit 493, 494, the armature being normally retracted and this circuit open, but adapted to be energized by the operation of the relay. The wires 493 and 494 lead from the high voltage means 480, and this circuit includes a solenoid 495, which is thus powerfully energized for each leaky lamp reaching station 16. The solenoid is energized with a definite timing, since the relay is controlled not merely by the manometer or detecting switch, but also by the cam operated switch 487, the cam 489 therefore determining the time of energizing and later deenergizing the solenoid.

The solenoid 495 thus energized at a definite point in each cycle, for each leaky lamp, is shown as operating through a core 496, which is pulled or lifted by the solenoid when energized, and which may operate through a mechanical connection or link 497 to perform any desired operation as a result of the detection of the leaky lamp. For example, these parts may operate a mere signal mounted on the head and which will serve to designate the defective lamp until later removed or separated from the perfect lamps. On the other hand the detecting devices may cause the operation of a lamp marking or branding means, each defective lamp being thus branded as such; or a lamp removing or ejecting mechanism may be operated, preferably at station 16, as will be more specifically described. A convenient means for marking each defective lamp, operated from shaft 200, under control of the detector, comprises a pencil, greasy or waxy, descending upon the lamp bulb top to mark it, with periodic pencil feed allowing for wear. Only when the lamp is leaky and shaft 200 makes one turn does this device operate. Or, if ink or paint is used, the marker or brush may hang from a yoke which is swung around in an overhead arc by an arm, which thus lands the marker first upon the bulb and then back to an ink pad or paint supply.

The restoring of pressure conditions in the detecting system will however be first described, it being necessary after each leaky lamp detection to restore the vacuum in the manometer and connecting tube 472. The branch tube 499 as shown in Fig. 4 extends to a valve consisting of a lower fixed section or seat 500 and an upper or rotary valve disk 501, these parts being shown also in Fig. 5, where bevel gears 502 are shown as driving the valve disk from the shaft 200, which it will be remembered is rotated from shaft 56 through clutch 516 for a single turn only on the occasion of the detection of a leaky lamp.

The reexhausting valve 500, 501 has its lower section 500 provided with an inlet port 504 to which the tube 499 leads. It also has an outlet port 505 from which lead tubes 506 and 507 extending to a preliminary vacuum source, for example the same vacuum pump as that to which tube 449 leads. The rotary valve disk 501 is formed with an interior annular channel 509 arranged so that it may, at certain times, afford a connection from port 504 to port 505 of the seat. Fig. 4 shows the direction of rotation of the valve and that it is about to make the desired connection whereby the manometer tube will be reevacuated after a detecting operation. This reexhausting of the detector system naturally can only be effected if the passages to the leaky lamp are suitably closed, which may be done by the tight closing of rubber plug 99 as already described, or the head may be isolated by the pinching together of the elongated rubber coupling or sleeve 118ª shown in Figs. 4 and 11ª, or perhaps the analogous rubber coupling 428. By these means the detecting apparatus is restored promptly after each operation so that it is ready to detect leakage in the lamp in the next succeeding head.

Leaky lamp ejecting

This mechanism is disclosed in Figs. 13 to 19, with necessary reference to Figs. 4 and 5. It has reference to the removing at station 16 of any lamp that has leaked air so as to cause operation of the solenoid 495 and the lifting of its core 496. The ejecting mechanism is operated from the third drive shaft 200, revolved at 1:1 ratio with the main drive shaft 56, but only when the lamp is defective. Therefore the clutch mechanism between shafts 56 and 200 will be first described. By removing or ejecting the leaky lamp it is intended to be representative of other modes of operating selectively upon it, as by branding or marking it, as later described, to distinguish it from a perfect lamp.

Loose on the drive shaft 56 is a bevel gear 514 driving a bevel gear 515 on the shaft 200. The clutching therefore takes place between the drive shaft 56 and the bevel gear 514. One clutch member 516 is in the form of a collar pinned to the gear 514 and both turning loosely on shaft 56, see Fig. 19. The complementary clutch member is the hardened disk 517 fast on the shaft 56. The driving clutch member 517 is formed with a single aperture or hole 518 arranged to receive a clutch pin 520 mounted in the driven clutch member 516. The clutch pin is pressed into clutching position by a spring 521 bearing against a bridge piece 522 at the outside of a recess or way 523 formed in the clutch member 516. Attached to the clutch pin 520 is a sliding piece or shoe 524 moving in the way 523 between the full line and the dotted positions of Fig. 19.

The clutch driven parts are to be normally disengaged, and the pin 524 held retracted, for example as follows. A combined wedge piece and stop 525 is shown mounted on a clutch lever 526 fulcrumed on a bracket 527 beneath the frame table 50, the free end of the lever being connected by the link 497 with the solenoid core 496. Normally the lever 526 is in its lowered position shown in Fig. 18. The driven parts have rotated until the shoe 524 has contacted the wedge 525 and has been thus retracted to open the clutch, the driven part rotation ceasing with the impact of the shoe 524 against the shoulder or stop of the wedge 525. Whenever the solenoid is energized the lever 526 is lifted, and shortly, within the same cycle is again lowered, as controlled by the cam 489. With the lifting of the lever and release of the shoe 524 the clutch closes for one rotation of the driven parts and is then reopened. The result is that the driven shaft 200 makes one single turn, during one cycle, following the detection of each leaky lamp.

For convenience the below-table parts will be described on Fig. 5 before coming to the defective lamp extracting device. On shaft 200 is shown a disk 530 containing a cam groove 531, see Fig. 15, this being engaged by a follower 532 on a lever arm 533 fulcrumed on a bracket 534, the lever having a horizontal arm 535, the end of which carries a stud or roller entered in a horizontal slot in a vertical sliding bar 536. These are the lifting and lowering connections for the ejecting device.

Also carried on shaft 200 is a disk 537 formed with a cam groove 538 engaged by a follower 539 on a cam lever 540, a part of which is a segment with rack teeth 541. The curved rack thus oscillated engages with an elongated gear 542 mounted on a vertical shaft 543, these parts being shown also in Fig. 14. The shaft 543 has its lower bearing 544 attached to the vertical slidebar 536, this system rising and falling as a unit, as permitted by the elongated gear 542.

The description of the ejecting parts may be continued on Figs. 13 to 17 on sheet 6. The vertical slidebar 536 passes through a fixed bearing 547 at the top side of the table 50 and it carries bodily the ejecting devices. At the top of the slidebar is mounted a slideway 548, the bar being attached to a flat side of the slideway, the remainder of it being circular as Fig. 14 shows. Extending rightwardly from the slideway is an extension 549 to accommodate a gear 550 which is mounted at the top end of the vertical shaft 543 already described, this shaft having its upper bearing in the extension 549. The gear 550 is shown engaged with a rack 551 mounted in a longitudinal way in the slideway for rearward and frontward reciprocation, and having a block or rackhead 552 at its front end.

Another slidable member mounted in the slideway 548 is a hollow sliderod 553, which also is a rockshaft as it is capable of rotating during its sliding movement. At its rear end the hollow rod 553 carries a rod head 554 which, as seen in Fig. 14, is square, its corners therefore overlapping the slideway and contacting the rear face of the slideway as a stop, limiting the frontward movement of the rod. The rod head 554 also carries the lamp extracting jaws 555 and 556 and may be termed a jaw head.

The jaw 555 is mounted fixedly on the jaw head 554 while the other jaw 556, having an offset shank 557 is mounted to swing about a pivot 558 on the fixed jaw. There is no jaw closing spring, the closing being by a positive movement to be described, and the opening of the jaw being due to the weight of the extracted lamp when the jaw is released. The means for closing the jaw 556 comprises primarily a plunger or jaw closer 560 mounted on an axial shank 561, with a cushion spring 562 surrounding the shank. The plunger is arranged to slide within the jaw head 554, but need not rotate with it.

In general the motion of the jaws 555, 556 is that, in their lowered position, when the slidebar 536 is down, they are advanced by the action of the gear and rack 550 and 551 as will be described, so that the jaws pass one to each side of the glass pipe e of the lamp, the swingable jaw being then closed, as shown in dotted lines in the top view Fig. 13, this being followed by the bodily lifting of the entire system, by the slidebar 536, and then by the bodily retraction frontwardly of the jaw system, with the lamp, until, near the fully retracted position the jaws are bodily rotated by the turning of the hollow rod 553, and the swingable jaw is then released by the plunger 560, so that the lamp readily tumbles out of the jaws into a convenient waste receptacle.

The details of the ejector mechanism for producing these movements may be as follows. Attached to the front end of the slideway 540 is shown a cylindrical shell 565, in the nature of a housing, entirely enclosing the rack 551 in its frontwardly retracted position. The cylindrical housing is attached by screws 566 to the slideway. For rotating the hollow rod 553, to tilt over the jaws and lamp, the cylindrical shell 565 is shown formed with a cam or slot 568. This is formed first with a slanting cam section 569 followed by a dwell or longitudinal section 570 as best seen in the bottom plan view Fig. 15ª. Engaged in the cam slot 568 is a stud 571 projecting outwardly from a cylindrical block or head 572 at the front end of the hollow rod 553. By this means as the rod advances rearwardly it is first turned through 90° and thereafter advances without further rotation. Near the stud 571 is also a stop screw 573 on the block 572, this being arranged to contact with the rear face 574 of the slideway 540. These stops limit the rearward advance of the hollow rod, the further movement of the interior parts causing the closing of the swinging jaw.

The jaw closing plunger 560 has its shank 561 connected by a pin and slot device 578 with an intermediate plunger section 579, these thus having slip motion or play, a spring 562 tending to hold the plunger 560 advanced. Near its rear end the plunger section 579 is formed with a flange 580 sliding within the hollow rod 553. This flange at the front abuts against the front block 572 of the hollow rod. A spring 581 is confined between the flange 580 and a shoulder 582 formed to the rear thereof within the hollow rod. Frontward of the flange 582 the plunger 579 is extended as a sleeve 583, the forward end of which is beveled at 584 as best shown in Figs. 16 and 17. By a pin and slot connection 586 the sleeve 583 is connected, with loose motion, with an interior rod 587. This inside rod at its exterior front end has attached to it a pair of collars 588 confining between them the offset part 589 of the rack head 552. Loosely surrounding the inside rod 587 is shown a washer 591 large enough to bear against the head 572, and between this washer and the collar 588 is confined a spring 592.

When the jaw closing parts are in their advance position, they are held there by a latch 594, seen more particularly in Figs. 16 and 17, this having its fulcrum 595 formed in ears extending adjacent to a slot in the rear end of the block 572. Fig. 16 shows the parts in latched position. The latch has an extension or tail 596 which is of ring-shape, extending around to the far side of the block, where it is pressed toward latching position by a spring pin 597. At a certain stage in the movements the latch is thrown back by the frontward retraction of the parts, bringing the latch tail against the fixed stop 598 attached at the inner side of the fixed shell 565, thus releasing the intermediate plunger 579 and allowing it to retract to its frontward position as in Fig. 17.

The lamp ejection action for a single turn of shaft 200 may be as follows. The parts are initially retracted and lowered as in Figs. 13–15. By gear 550 the rack 551 is advanced rearward toward the head, and with it all interior parts. The hollow rod 553 and jaw head 554 first are turned 90° during this advance, by cam 569, and then continue with the jaws set flatwise, until the exhaust pipe is between them. Stop 573 now meets stop 574 and the hollow rod stops advancing. The continued movement actuates the inside parts, and plunger 579 advancing, causes jaw 556 to close on and grip the glass pipe, while the front sleeve 583 becomes latched as in Fig. 16, holding the jaws closed on the lamp. The slidebar 536 now lifts the entirety until the lamp is vertically clear of the head, and the gear and rack then retract the parts, the jaws remaining latched. The retracting lamp first remains vertical until horizontally clear of the head, but then the cam 569 turns the hollow rod, and the jaws and lamp tilt over. At the end of the retraction the latch opens itself against contact 598, as in Fig. 17, releasing the jaw 556 and allowing the lamp to tumble out, into a chute or receptacle. In the meanwhile the slidebar 536 has descended and the parts come to rest in initial position, for a repetition of action, as clutch 516, 517 is opened and shaft 200 stopped.

Supplemental explanations

A certain further discussion is desirable to make clear certain matters of terminology and scope. What may be termed the cycle or index cycle of the machine, is that which occurs for each station, and may comprise say ½ second for the indexing movement and 2½ seconds pause at the station, a total of 3 seconds for the cycle. Some operations occur during advance or indexing and others during pauses. The head and lamp travel is preferably intermittent so as to afford pauses for certain operations, which however could be adapted to continuous travel on well known principles. The complete or general cycle of the machine comprises all steps around the circuit, and 30 stations being provided, this cycle, at 3 seconds per index cycle will be 90 seconds.

The described head may be considered a rotatable head in the sense that the lamp carrying parts are fitted to rotate with the lamp, for the purposes of the sealing-in operation. This will be a planetary head motion when the conveyor is a revolving turret. The rotary head parts are assembled within the head bearing 64 and may make for example 4½ turns per index cycle during sealing-in. The rotatable bulb holder element of the head may be considered simply as the ring 77 within which the bulb rests by the three contacts 78, or it may be considered as the entire rotary frame 75—78. These parts retain and position the bulb, and later support or carry the sealed-in lamp. The bulb holder is at the top of a hollow shank 73, termed a sleeve.

The stem support of the head may be considered the top piece 87 on the hollow end piece 86 of the hollow shank or sleeve 85, the support 87 functioning to carry and position the lamp stem or mount.

The sleeves of the bulb holder and stem support are concentric with the rotation axis and preferably these parts are all vertically shiftable relatively to each other, and relatively to a rotary sleeve 69 turning within the bearing 64 and from which the other sleeves derive their rotation.

Beside the bearing 64 each head comprises other non-rotatable parts including the axially located coupling 99, normally open or loose, but adapted to be coupled under pressure with the glass exhaust tube e and the exhaust passage or non-rotatable sleeve 100. By a relative vertical movement between sleeve 100 and sleeve 95 the plug is put under coupling pressure, preferably by the forcible lifting of the interior sleeve or exhausting tube 100 of the head. These various head parts, conveniently described as vertical, may of course be otherwise disposed, preferably substantially upright, these terms being used in a relative sense.

The general or conveyor cycle of the machine may be divided generally into a first operating or travel period, extending from stations 5 to 13, during which the heads are rotated, for sealing-in and other purposes; and a subsequent period extending from stations 17 to 29 during which exhausting, filling etc. take place; and with operations between said periods, as the coupling, seal-stretching, and lamp testing operations following the rotation period, and tipping-off outfeeding, cullet extracting and infeeding operations following the period of exhausting.

The control of exhausting, lamp testing, and flushing or filling operations, is by the main valve comprising its disk or movable part 426, preferably rotating on the fixed valve seat 427. The various disk ports described are in a concentric or circular series, there being 30 of them, one connected to the exhaust passage 101 of each head. The seat has correspondingly positioned ports leading to the exhausting pumps, sources of gas and leak detector.

The sequence of operations on the lamp has been described, and may be supplemented as follows. Initially, when each head is being loaded at stations 1, 2 and 3, the bulb holder 77 and its sleeve 73 are down, the stem support 86 and its sleeve 85 are up and the coupling sleeve 100 is down, and the coupling 99 open. The stem is inserted with the glass tube and lead wires extended loosely through the stem support 86 and the tube loosely through the coupling 99. These positions of the sleeves 73, 85 and 100 continue through the period of head rotation from stations 5 to 13, the sealing-in at stations 5 to 11, and the skirt cullet removal and annealing at stations 12 and 13. During the pause at station 13 the stop 150 arrests the rotation and locks the head in a definite position for later operations.

At this point in the general cycle the sleeve 100 is raised to close the coupling on the exhaust tube, thus connecting the lamp with the vacuum connections and gripping the tube. The heating zone terminates at about this point, while beyond station 13, preferably approaching station 14, the sleeve 73 is lifted, as ⅛ inch, to lift the bulb and thus stretch the seal between bulb and stem, before the glass has cooled enough to harden.

While the holder 77 and bulb might from this point be maintained in its partly elevated position until the tipping-off operation, it is shown for convenience as being lowered again, ⅛ inch, to its initial position. The lifting and lowering are by a passive device, as the fixed cam 165, operating by the indexing movement.

Assuming detection and ejection of leaky lamps at station 16, the stem sleeve 85 may be lowered at station 15, thus giving access for lamp extracting purposes; otherwise this lowering, perhaps of ¾ inch might be postponed to station 25, thus minimizing the overheating of the lower-down parts within which the rubber coupling is accommodated. At station 16 is indicated the detection of a leaky lamp by loss of vacuum in the passages leading thereto. This detection may function to indicate in any way the defect, or may place a mark on the lamp or eject it from the head, in either case the passages preferably being tightly closed off to protect the vacuum. For detection the main valve connects the lamp and head with a pressure-responsive instrument, or pressurestat, as the hydraulic device 473, which controls certain circuits that bring about the indicating or ejecting action, the circuits however being under the master control of the cam 489 which determines the timing. In case of ejection of defective lamp the sleeve 100 is first lowered at station 16 to initial position, this corresponding with the shift from position y to x on Fig. 12. This permits the lifting out of the defective lamp, upon which the sleeve 100 rises to its highest position, corresponding with shift from position x to z on Fig. 12, thus closing off entirely the coupling against air inflow to the vacuum connections. Shortly, as described, the vacuum connections to the instrument 473 are reexhausted.

Following the described exhausting, partial flushing, and filling or final exhausting, at stations 17 to 28 or 29, occurs the tipping-off operation; but preceding this operates the lead-wire repositioning at stations 25 to 27. After the stem support 86 has been lowered at station 15, or ahead of station 25, thus exposing the leadwires to access, they are deflected laterally or frontward by the movable hooks or claw devices described, during pause in travel, with a final bending up of the wires for protection during tipping-off.

For the tipping-off operation the bulb sleeve 73 is first raised, as ⅛ inch, if it has been lowered to initial position at station 15. By this the holder steadies the lamp while the tube is being softened. This is followed by a second lifting of the sleeve 73 and bulb holder, as ¼ inch, to take part in the tipping-off by stretching the softened tube. Preferably at the same station the sleeve, holder, and completed lamp, are now lifted extensively further, for example 3 inches higher, this constituting the first step in the outfeeding of the lamp. The outfeeding spring chuck being properly positioned over the head the lifted lamp has its bulb snapped into the chuck, and thereupon the sleeve 73 descends, say 3¾ inches to initial lowered position, permitting the chuck to be swung away laterally, the lamp clearing the head and being brought to delivery position.

For the purpose of extracting the pipe and skirt cullets at station 30 the sleeve 100 lowers to initial position, thus uncoupling the pipe cullet, but only after it has been grasped by the extractor. The tube cullet extractor or gripper, and the skirt cullet extractor in the nature of a fork or scoop, preferably operate at the same station.

Following this final operation the sleeve 85 and stem support are raised to initial position, and all three of the sleeves and carried parts now stand in their initial position, ready for infeed at stations 1, 2 and 3 and a repeat of cycle as already described.

1. An automatic machine for exhausting and tipping-off electric lamps, comprising a conveyor carrying a series of heads and having means to advance it to cause each head to travel around a circuit, each head having an axially liftable holder for the lamp, and for each head an exhaust passage, and a coupling for connecting the lamp stem exhaust tube to such exhaust passage; in combination with means to close the coupling of each head thereby to grip and hold the lamp exhaust tube and connect it with the exhaust passage, exhausting connections operative after closing of said coupling for exhausting the lamp or gas-filling it via said exhaust passage, means for tipping-off each exhausted or filled lamp comprising a burner to produce a flame directed upon its exhaust tube, and means to lift the bulb holder, after the exhausting first sufficiently to stretch the exhaust tube during tipping-off and then to a substantially higher point for outfeeding the lamp, with means to lift the burner with the holder during stretching of the tube, and means to stop the lifting of the burner as the holder rises further for outfeed.

2. An automatic machine for exhausting and tipping-off electric lamps, comprising a conveyor carrying a series of upright heads and having means to advance it to cause each head to travel around a circuit, each head having an axially liftable holder for the lamp, and means to grip the lamp exhaust tube, means for tipping-off each lamp comprising a burner to produce a flame directed upon its exhaust tube, above such gripping means, and means to lift the bulb holder first sufficiently to stretch the exhaust tube during tipping-off and then to a higher point for outfeeding the lamp, with means to lift the burner with the holder during stretching of the tube and means to stop the lifting of the burner as the holder rises further for outfeed.

3. A machine as in claim 1 and wherein the head travel is intermittent and the tipping-off and outfeeding are effected during the same pause of each lamp, and there being an outfeeding chuck adapted to engage mechanically each lifted lamp by the rise of its holder before the holder returns down and the head resumes travel, and mechanism to shift the chuck and lamp laterally away and deliver the lamp before returning for the next head.

4. An automatic sealing-in and exhausting machine for electric lamps, comprising a conveyor carrying a series of heads and having means to advance it to cause each head to travel around a predetermined circuit, each head having a rotatable support for the flange of the lamp stem, formed with axial aperture loosely receiving the exhaust tube and leadwires, and a rotatable holder for the lamp bulb, adapted to position the bulb with its depending skirt concentrically surrounding the stem flange, said holder and support having relative axial motion as by lowering the support, and for each head an exhaust passage, and a normally open coupling for connecting the stem exhaust tube to such exhaust passage; in combination with mechanism to rotate cooperatively the bulb holder and stem support of each head during a first period while the coupling remains open and while flames are directed toward the rotating lamp parts thereby to seal-in the lamp, mechanism to close the coupling of each head after the period of head rotation thereby to grip the exhaust tube and connect the sealed-in lamp with the exhaust passage, exhausting connections operative after closing of said coupling during a second period of head travel for exhausting each lamp or gas-filling it via said exhaust passage, means for causing relative axial lowering of the stem support to expose the exhaust tube for tipping-off, means for thereafter deflecting the leadwires laterally away from the exhaust tube, and means for thereafter tipping-off each exhausted or filled lamp by a flame directed upon its exhaust tube.

5. Machine as in claim 4 and wherein the conveyor advances step by step, and the leadwire deflecting means is arranged to operate during pause of each head, and contains deflectors or claws movable during such pause to bend the leadwires transversely to the travel direction; these features being claimed whether or not the head parts rotate during sealing-in as recited in said claim.

6. An automatic sealing-in and exhausting machine for electric lamps, comprising a conveyor carrying a series of heads and having means to advance it to cause each head to travel around a predetermined circuit, each head having a rotatable support for the flange of the lamp stem, formed with axial aperture loosely receiving the exhaust tube, and a rotatable holder for the lamp bulb, adapted to position the bulb with its depending skirt concentrically surrounding the stem flange, said holder and support having relative axial motion as by lowering the support, and for each head an exhaust passage, and a normally open coupling for connecting the stem exhaust tube to such exhaust passage; in combination with mechanism to rotate cooperatively the bulb holder and stem support of each head during a first period while the coupling remains open and while flames are directed toward the rotating lamp parts thereby to seal-in the lamp, leaving the detached skirt cullet surrounding said support, mechanism to close the coupling of each head after the period of head rotation thereby to grip the exhaust tube and connect the sealed-in lamp with the exhaust passage, exhausting connections operative after closing of said coupling during a second period of head travel for exhausting each lamp or gas-filling it via said exhaust passage, means for causing relative axial lowering of the stem support to expose the exhaust tube for tipping-off, means for thereafter tipping-off each exhausted or filled lamp by a flame directed upon its exhaust tube, leaving the tube cullet held in said coupling, means for thereafter outfeeding the lamp from the head, and timed cullet extracting means operating thereafter, comprising a device to reach into the head, and engage one or both cullets, lift the same, retract laterally and discharge.

7. A machine as in claim 6 and wherein the cullet extracting means comprises a fork to slide under the skirt cullet and a gripper to grip the tube cullet before said coupling releases it, both mounted on an extractor shank, with means to lift and retract the shank with cullets and to lower and advance the shank after discharge of cullets.

8. An automatic sealing-in and exhausting machine for electric lamps, comprising a conveyor carrying a series of heads and having means to advance it to cause each head to travel around a predetermined circuit, and for each head an exhaust passage leading downwardly and to an exhausting valve, with a liquid trap containing a screen, and a removable bottom stopper having means to compress it vertically to cause its gastight sealing.

9. An automatic sealing-in and exhausting machine for electric lamps, comprising a conveyor carrying a series of heads and having means to advance it to cause each head to travel around a predetermined circuit, each head having a rotatable support for the flange of the lamp stem, formed with axial aperture loosely receiving the exhaust tube and leadwires, and a rotatable holder for the lamp bulb, adapted to position the bulb with its depending skirt concentrically surrounding the stem flange, in combination with mechanism to rotate the bulb holder and stem support of each head throughout a period of travel while flames are directed toward the rotating lamp parts thereby to seal-in the lamp, comprising a pulley on each head, a drive belt running in driving contact directly upon a number of such head pulleys, said belt being wholly exterior to the head series, and means for driving said belt.

10. An automatic sealing-in and exhausting machine for electric lamps, comprising a conveyor carrying a series of heads and having means to advance it to cause each head to travel around a predetermined circuit, each head having a rotatable support for the flange of the lamp stem, and a rotatable holder for the lamp bulb, adapted to position the bulb with its depending skirt concentrically surrounding the stem flange, in combination with mechanism to rotate the holder and support of each head during a period while flames are directed toward the rotating lamp parts thereby to seal-in the lamp, and arresting means to stop the rotation of each head after the rotation period and hold the head in a definite position throughout exhausting and subsequent operations.

11. A machine as in claim 10, the arresting means comprising a retractible dog for each head, adapted to engage a shoulder on a rotating part, and timed means causing the dog to operate at a predetermined point of travel.

12. An automatic exhausting and tipping-off machine for electric lamps, comprising a conveyor carrying a series of heads and having means to advance it to cause each head to travel around a predetermined circuit, each head having a holder for the lamp bulb part, an exhaust passage, and a coupling for connecting the lamp stem exhaust tube to such exhaust passage; in combination with exhausting connections for exhausting the lamp or gas-filling it via said exhaust passage, means for tipping-off each exhausted or filled lamp by a flame directed upon its exhaust tube, and mechanism operable before tipping-off comprising claws and means to actuate them to reach in to each head and there to engage the leadwires and to bend and position the leadwires away from the exhaust tube.

13. A machine as in claim 12, and wherein the conveyor pauses at each station and the bending mechanism is arranged to operate during a pause of each head to engage and deflect the leadwires laterally to conveyor travel.

14. A machine as in claim 12 and wherein at one station the bending mechanism bends the wires out and up as stated, and at a subsequent station is an upbending finger and means actuating it to bend further upwardly the leadwires.

15. An automatic exhausting and tipping-off machine for electric lamps, comprising a conveyor or revoluble turret carrying a series of heads and having means to advance it to cause each head to travel around a predetermined circuit, each head having a holder for the lamp bulb part, an exhaust passage, and a coupling for connecting the lamp stem exhaust tube to such exhaust passage; in combination with exhausting connections for exhausting the lamp or gas-filling it via said exhaust passage, means for tipping-off each exhausted or filled lamp by a flame directed upon its exhaust tube, and mechanism operable before tipping-off comprising movable claws and means to actuate them to reach into each head and there to engage the leadwires and to bend and position the leadwires away from the exhaust tube; the leadwire positioning claws being arranged to operate at the two sides of the exhaust tube and adapted to gather in the leadwires and to embrace and scrape around the sides of the tube with such leadwires and to overlap each other during such operation to prevent escape of leadwires.

16. A machine as in claim 15 and wherein is a group of claws at each side, the claws of each group offset longitudinally for successive action.

17. A machine as in claim 15 and wherein is a group of claws at each side, the claws of each group offset longitudinally for successive action, with springs pressing inwardly independently the several claws, and a pair of carriers, one for each claw-group, mounted to approach and separate, and means for causing them to separate, advance, approach and retract.

18. A machine as in claim 12 and wherein are deflecting claw carriers operable at opposite sides of the exhaust tube, a carriage on which said carriers are pivoted shiftable toward and from the lamp, and means timed to cause the swinging apart of the carriers and the advance of the carriage, followed by swinging together of the carriers and retraction of the carriage.

19. A machine as in claim 12 and wherein are deflecting claw carriers operable at opposite sides of the exhaust tube, a carriage on which said carriers are pivoted shiftable toward and from the lamp, and means timed to cause the swinging apart of the carriers and the advance of the carriage, followed by swinging together of the carriers and retraction of the carriage; said timed means comprising an actuator shiftable parallel to the carriage, with limiting stops between them, whereby the actuator first advances relatively to the carriage and then causes carriage advance, and vice versa, and means operated by the relative advance of the actuator to separate or spread the claw carriers and by its relative retraction to cause their approach before retraction of the carriage and claws.

20. A machine as in claim 12 and wherein are two or more claw mechanisms arranged to operate at relatively different angles upon the lamp in each head, thereby to ensure engaging and bending the leadwires.

21. A machine as in claim 12 and wherein are two claw mechanisms arranged for simultaneous and parallel action at two different stations, thereby to operate at relatively different angles upon the lamps in the two heads at the respective stations, thereby to ensure engaging and bending the leadwires.

22. An automatic lamp exhausting and tipping-off machine, comprising a conveyor carrying a series of heads and having means to advance it to cause each head to travel around a predetermined circuit, each head having a holder for the lamp bulb adapted to be lifted and lowered, an exhaust passage, and a coupling for connecting the lamp stem exhaust tube to such exhaust passage; in combination with mechanism to close the coupling of each head to hold its exhaust tube and thereby to connect the sealed-in lamp with the exhaust passage, exhausting connections operative after closing of said coupling for exhausting the lamp or gas-filling it via said exhaust passage; and means for tipping-off each exhausted or filled lamp by a flame directed upon its exhaust tube, comprising mechanism operating to retain the bulb holder at an elevation to steady the lamp during the softening of the tube and thereupon to lift to stretch the tube; and characterized further in that said mechanism comprises a holder lifting member at the tipping-off station, a carrying rod cam-actuated to lift the member, a separate carriage for the flame burner, resilient means tending to lift the carriage and flame with the rise of the bulb holder, and a control device or stop contact whereby the lift of the carrying rod controls the rise of the burner carriage.

23. An automatic lamp sealing-in or exhausting and tipping-off machine, comprising a conveyor carrying a series of heads and having means to advance it to cause each head to travel around a predetermined circuit, each head having a holder for the lamp bulb vertically shiftable for stretching a seal, an exhaust passage, and a coupling for connecting the lamp stem exhaust tube to such exhaust passage; means for exhausting the lamp or gas-filling it via said exhaust passage, and means for tipping-off each exhausted or filled lamp, together with means for outfeeding each lamp from its head, comprising timed mechanism to lift the holder and lamp so far that the lamp will clear the holder at its normal elevation, together with a spring closed chuck to receive the lamp by its lifting, hold it while the holder descends, and retract laterally to a delivery place, and means to deliver the lamp from the chuck.

24. An automatic lamp sealing-in or exhausting and tipping-off machine, comprising a conveyor carrying a series of heads and having means to advance it to cause each head to travel around a predetermined circuit, each head having a vertically shiftable member adapted to lift the lamp bodily, and means for outfeeding each lamp from its head, comprising timed mechanism to elevate the lifting member and lamp to a substantially elevated position, and a laterally shiftable chuck adapted to receive the elevated lamp, hold it while the member descends, and retract laterally to a delivery place, said chuck comprising engaging pieces mechanically grasping the lamp bulb.

25. A machine as in claim 24 and wherein the chuck comprises an overhead contact piece and spring fingers cooperating to clasp the elevated lamp, the contact piece adapted to descend at delivery to eject the lamp from the chuck.

26. A machine as in claim 24 and wherein is a swinging arm carrying the chuck between receiving and delivering positions, and carrying also an ejecting means operating at delivering position.

27. A machine as in claim 24 and wherein is a swinging arm carrying the chuck between receiving and delivery positions, and carrying also an ejecting means operating at delivering position, a cam-operated rockshaft to swing the arm, and a passive device or fixed cam to operate the ejecting means by the swing of the arm.

28. An automatic lamp sealing-in or exhausting and tipping-off machine, comprising a conveyor carrying a series of heads and having means to advance it to cause each head to travel around a predetermined circuit, each head having a vertically shiftable member adapted to lift the lamp bodily, means for outfeeding each lamp from its head, comprising timed mechanism to elevate the lifting member and lamp to an outfeeding elevation, and a laterally shiftable chuck adapted to receive the elevated lamp, hold it while the lifting member descends, and retract laterally to a delivery place, together with a tilting means to tilt the lamp during lateral retraction, and a receptacle or chute to receive the tilted delivered lamp.

29. A machine as in claim 28, the tilting means comprising a fixed part or hurdle in the retracting path of the lamp neck.

30. An automatic sealing-in and exhausting machine for electric lamps, comprising a conveyor carrying a series of heads and having means to advance it to cause each head to travel around a predetermined circuit, each head having a rotatable support for the lamp stem part, and a rotatable holder for the lamp bulb part, adapted to position the bulb with its depending skirt concentrically surrounding the flange of the stem, and for each head an exhaust passage, and a coupling for connecting the lamp stem exhaust tube to such exhaust passage; in combination with mechanism to rotate cooperatively the bulb holder and stem support of each head during a first period of travel while the coupling remains open and while flames are directed toward the rotating lamp parts thereby to fuse together the bulb skirt and stem flange and thus seal-in the lamp, mechanism to close the coupling of each head after the period of head rotation thereby to connect the sealed-in lamp with the exhaust passage, exhausting connections operative after closing of said coupling during a second period of head travel for exhausting the lamp or gas-filling it via said exhaust passage, and means for tipping-off each exhausted or filled lamp by a flame directed upon its exhaust tube; and characterized further in the provision of mechanism operable after removal of the lamp from the head to remove the bulb skirt cullet or the stem tube cullet or both, comprising a cullet engaging extractor having a shank, and timed means causing the extractor to reach into the head and engage the cullet, and then lift and retract with the cullet to discharge position.

31. A machine as in claim 30 and wherein the tube cullet extractor comprises gripper jaws, with means to close them upon the cullet and cause them to lift after the coupling has released the cullet, and upon retraction to release the cullet for discharge.

32. An automatic lamp sealing-in, exhausting and tipping-off machine, comprising a conveyor carrying a series of heads and having means to advance it to cause each head to travel around a predetermined circuit, each head having a holder for the lamp bulb and a support for the lamp stem, an exhaust passage, and a coupling for connecting the lamp stem exhaust tube to such exhaust passage; means for sealing-in the lamp and thereby leaving a bulb skirt cullet on the support, means for exhausting the lamp or gas-filling it via said exhaust passage and means for tipping-off each exhausted or filled lamp, thereby leaving a tube cullet in the coupling, and means operating after removal of each lamp from its head for extracting said skirt and tube cullets, comprising an extractor or fork to reach under and lift the skirt cullet from the support, and an extractor or gripper to reach in and grasp the tube cullet, and lift it after release of said coupling, and mechanism to operate said extractors to lift and retract and discharge said cullets.

33. A machine as in claim 32 and wherein both extractors operate at the same head station, said mechanism operating to advance both extractors to engage the cullets, lift both to clear the cullets from the head and retract both for discharge.

34. An automatic lamp sealing-in and exhausting machine, comprising a conveyor carrying a series of heads and having means to advance it to cause each head to travel around a predetermined circuit, each head having a holder for the lamp bulb and a support for the lamp stem, an exhaust passage, and a coupling for connecting the lamp stem exhaust tube to such exhaust passage; means for sealing-in the lamp and thereby leaving a bulb skirt cullet on the support, means for exhausting the lamp or gas-filling it via said exhaust passage and means for tipping-off each exhausted or filled lamp, and means operating after removal of each lamp from its head for extracting said skirt cullet, comprising a lifter or fork to reach under and lift the skirt cullet from the support, a shank carrying said lifter, and mechanism for actuating said shank to advance, lift, retract and lower, thereby to operate said lifter to lift and retract said cullet, and a discharge means or stripper operating at discharge position to discharge the cullet from the lifter.

35. An automatic machine for exhausting or filling sealed-in electric lamps, comprising a turret carrying a series of heads and having means to revolve it to cause each head to travel around a predetermined circuit, each head having a holder for the lamp, an exhaust passage, and a coupling for connecting the lamp stem exhaust tube to such exhaust passage; and means operative after closing of said coupling for exhausting the lamp or gas-filling it via said exhaust passage, comprising a valve seat member having exhausting or filling ports, and a valve disk turning with said turret and having a circular series of ports, one connected to each head exhaust passage, and said seat member being formed with a vacuum chamber of substantial size with which chamber such vacuum ports connect, and said chamber being exposed to said disk over an unported area of the disk of substantial area, whereby atmospheric pressure tends to ensure a tight running fit between disk and seat members.

36. An automatic machine for exhausting or filling sealed-in electric lamps, comprising a conveyor carrying a series of heads and having means to revolve it to cause each head to travel around a predetermined circuit, each head having a holder for the lamp, an exhaust passage, and a coupling for connecting the lamp stem exhaust tube to such exhaust passage; and means operative after closing of said coupling for exhausting the lamp via said exhaust passage, comprising a valve seat having an exhausting port followed by a leak detecting port, a valve disk turning with said turret and having a circular series of ports, one connected to each head exhaust passage, a pressure-responsive instrument connected with said detecting port, a circuit controlled by said instrument, a magnetic actuator or trip controlled by said circuit, and timed means actuated thereby to perform a selective operation upon a leaky lamp.

37. A machine as in claim 36 and wherein the instrument is a mercury gage, having a normal level when exposed to the normal vacuum of said exhausting port, with circuit contacts normally above or below such level but reversed by change of level due to pressure received from a leaky lamp.

38. A machine as in claim 36 and wherein is a master control, timing the opening and closing of circuit in case of a leaky lamp.

39. An automatic machine for exhausting or filling sealed-in electric lamps, comprising a conveyor carrying a series of heads and having means to revolve it to cause each head to travel around a predetermined circuit, each head having a holder for the lamp, an exhaust passage, and a coupling for connecting the lamp stem exhaust tube to such exhaust passage; and means operative after closing of said coupling for exhausting the lamp via said exhaust passage, comprising a valve seat having an exhausting port follower by a leak detecting port, a valve disk turning with said turret and having a circular series of ports, one connected to each head exhaust passage, a pressure-responsive instrument connected with said detecting port with timed means controlled thereby to perform a selective operation upon a leaky lamp, timed means to close off from automatically the valve the head carrying the leaky lamp, and timed means to re-exhaust automatically the pressure responsive instrument and connection thereto.

40. An automatic machine for exhausting or filling sealed-in electric lamps, comprising a conveyor carrying a series of heads and having means to revolve it to cause each head to travel around a predetermined circuit, each head having a holder for the lamp, an exhaust passage, and a coupling for connecting the lamp stem exhaust tube to such exhaust passage; means operative after closing of said coupling for exhausting the lamp via said exhaust passage, a pressurestat responsive to a leaky lamp, and lamp ejecting mechanism controlled by said pressurestat, comprising an extractor fitted to reach into the head, grasp the lamp, lift it, retract it from the head and discharge it.

41. A machine as in claim 40 and wherein the extractor comprises a jaw pair on a jaw head, mounted for advance and retraction, lifting and lowering and rotary tilting, with timed mechanism operable to advance the jaws to the head, close them to grasp the lamp, lift the jaw head and lamp, retract them, and tilt them, releasing the jaws to discharge the defective lamp.

42. A machine as in claim 40 and wherein the extractor comprises a jaw pair on a jaw head, mounted for advance and retraction, lifting and lowering and rotary tilting, with timed mechanism operable to advance the jaws to the head, close them to grasp the lamp, lift the jaw head and lamp, retract them, and tilt them, releasing the jaws to discharge the defective lamp; and wherein is a jaw closing plunger, moved relatively to close the jaws, a latch to hold them closed until reaching discharge position, and a cam groove to tilt the jaw head during retraction.

43. An automatic machine for exhausting or filling sealed-in electric lamps, comprising a conveyor carrying a series of heads and having means to revolve it to cause each head to travel around a predetermined circuit, each head having a holder for the lamp, an exhaust passage, and a coupling for connecting the lamp stem exhaust tube to such exhaust passage; means operative after closing of said coupling for exhausting the lamp via said exhaust passage, an instrument responsive to a leaky lamp, and lamp ejecting mechanism controlled by said instrument, comprising an extractor fitted to reach into the head, grasp the lamp, lift it, retract it from the head and discharge it, an extractor operating shaft normally idle, a clutch to cause said shaft to perform one operation and closed and opened by control of said instrument, connections from the shaft to actuate the extractor, and connections from the shaft for opening said coupling before extraction of lamp and for closing off the head from the exhausting means.

44. An automatic sealing-in and exhausting machine for electric lamps, comprising a conveyor turret carrying a series of heads and having means to advance it to cause each head to travel around a predetermined circuit, each head having a support for the lamp stem part, and a holder for the lamp bulb part, adapted to position the bulb with its depending skirt concentrically surrounding the flange of the stem, and for each head an exhaust passage coupled with exhausting connections, and a coupling for connecting the lamp stem exhaust tube to such exhaust passage; in combination with means for sealing-in the lamp parts during a first period of travel by flames directed toward the lamp parts, exhausting connections operative during a second period of head travel for exhausting the lamp or gas-filling it via said exhaust passage, a normally exhausted test means for detecting leakiness of the lamp in each head after sealing-in and after a preliminary exhausting operation by testing the pressure in said exhaust passage or exhausting connections, means controlled by said test means to release each leaky lamp from said coupling, means for thereupon ejecting or extracting the leaky lamp from the head, means for thereupon closing-off said exhaust tube or connections from the source of vacuum, and means for thereupon reexhausting said test means in time for testing the next succeeding lamp.

45. An automatic sealing-in and exhausting machine for electric lamps, comprising a conveyor carrying a series of heads and having means to advance it to cause each head to travel around a predetermined circuit, each head having a rotatable support for the lamp stem part, and a rotatable and axially liftable holder for the lamp bulb part, adapted to position the bulb with its depending skirt concentrically surrounding the flange of the stem, and for each head an exhaust passage, and a coupling for connecting the lamp stem exhaust tube to such exhaust passage; in combination with means to rotate the holder and support of each head during a first period while the coupling remains open and while flames are applied to the rotating lamp parts thereby to fuse together the bulb skirt and stem flange and thus seal-in the lamp, means to close the coupling of each head after the period of head rotation thereby to grip and hold the lamp exhaust tube and connect it with the exhaust passage, exhausting connections operative after closing of said coupling during a second period for exhausting the lamp or gas-filling it via said exhaust passage, means for tipping-off each exhausted or filled lamp comprising a burner affording a flame directed upon the lamp exhaust tube, and means to lift the bulb holder, first after the sealing-in to stretch the seal between bulb and stem, and subsequently to stretch the exhaust tube during tipping-off, said lifting means arranged also, with the lift of the holder, to lift the burner of the tipping-off flame, to accompany the rise of the lamp, for part of its lift, with means thereupon to stop the rise of the burner, while the holder continues to lift the lamp to complete the tipping-off operation.

46. An automatic sealing-in and exhausting machine for electric lamps, comprising a conveyor carrying a series of heads and having means to advance it to cause each head to travel around a predetermined circuit, each head having a rotatable support for the lamp stem part, and a rotatable holder for the lamp bulb part, adapted to position the bulb with its depending skirt concentrically surrounding the flange of the stem, and for each head an exhaust passage, and a coupling for connecting the lamp stem exhaust tube to such exhaust passage; in combination with mechanism to rotate cooperatively the bulb holder and stem support of each head during a first period of travel while the coupling remains open and while flames are directed toward the rotating lamp parts thereby to fuse together the bulb skirt and stem flange and thus seal-in the lamp, mechanism to close the coupling of each head after the period of head rotation thereby to connect the sealed-in lamp with the exhaust passage, exhausting connections operative after closing of said coupling during a second period of head travel for exhausting the lamp or gas-filling it via said exhaust passage, and means for tipping-off each exhausted or filled lamp by a flame directed upon its exhaust tube; and characterized further in the provision of means relatively to lower the stem support after the stem tube is held by the coupling, and movable means thereafter operable to reach in laterally and engage the leadwires adjacent the stem tube and pull them away from the stem tube laterally to the direction of head travel preparatory to tipping-off the stem tube.

47. An automatic lamp exhausting and tipping-off machine, comprising a conveyor carrying a series of heads and having means to advance it to cause each head to travel with indexing movements around a predetermined circuit, each head having a holder for the lamp bulb, an exhaust passage and a coupling for connecting the lamp stem exhaust tube to such exhaust passage; in combination with mechanism to close the coupling of each head to hold its exhaust tube and thereby to connect the sealed-in lamp with the exhaust passage, exhausting connections operative after closing of said coupling for exhausting the lamp or gas-filling it via said exhaust passage; and means for tipping-off each exhausted or filled lamp by a flame directed upon its exhaust tube, comprising mechanism operating to retain the bulb holder at an elevation to steady the lamp during the softening of the tube and thereupon to lift to stretch the tube; and characterized further in the provision of a movable flame shield and a swingable arm carrying it, said arm having a contact portion and each head having a circular portion cooperating with said contact portion, the arm having spring means pressing said contact portion toward the circular portions of the heads, whereby the indexing movements of the heads cause the swinging of the arm in to bring the shield to position above the tipping-off point in protection of each lamp from the heat and the swinging of the arm out as the lamp advances from tipping-off position.

48. An automatic lamp exhausting and tipping-off machine, comprising a conveyor carrying a series of heads and having means to advance it to cause each head to travel with indexing movements around a predetermined circuit, each head having a holder for the lamp bulb, an exhaust passage, and a coupling for connecting the lamp stem exhaust tube to such exhaust passage; in combination with mechanism to close the coupling of each head to hold its exhaust tube and thereby to connect the sealed-in lamp with the exhaust passage, exhausting connections operative after closing of said coupling for exhausting the lamp or gas-filling it via said exhaust passage; and means for tipping-off each exhausted or filled lamp by a flame directed upon its exhaust tube, comprising mechanism operating to retain the bulb holder at an elevation to steady the lamp during the softening of the tube and thereupon to lift to stretch the tube; and characterized further in that the mechanism which lifts the bulb holder for tipping-off is caused next to lift it much further thereby to raise the lamp to an extreme elevated outfeeding position, and in the provision of an overhead mechanical grasping means arranged to grasp the lamp bulb by reason of such raising thereof, and means for shifting such grasping means for outfeeding the lamp from each holder at such extreme elevation.

49. A machine for exhausting or filling and tipping-off lamps, having a rotary turret conveying a series of heads, each head having an exhaust passage with coupling to connect it to the exhaust tube of the lamp, a central exhaust valve comprising a rotary disk turning with the turret, and a non-rotary valve seat; the disk having a peripheral series of disk ports connected to the respective exhaust passages of the heads, the seat having a central vacuum chamber connected with a vacuum line and exposed to the valve disk, the seat having a peripheral series of seat ports for registering with the successive disk ports, certain of said seat ports being extended into connection with said vacuum chamber for evacuation of lamps, and others of said seat ports being connected peripherally with other sources for other operations upon the successive lamps.

50. A machine as in claim 49 and wherein some of the peripheral seat ports other than such evacuation ports are flushing ports, alternated with such evacuation ports; and said seat having a peripheral flushing chamber to which such flushing ports extend, and a flushing line connected to said flushing chamber.

51. A machine as in claim 49 and wherein some of the peripheral seat ports other than such evacuation ports are flushing ports, alternated with such evacuation ports; and said seat having a peripheral flushing chamber to which such flushing ports extend, and a flushing line connected to said flushing chamber; and wherein the turret has means advancing it and the heads and disk intermittently between stations, and the disk ports register with the evacuating seat ports during pauses of travel and with the flushing ports only during travel between pauses.

52. A machine as in claim 49 and wherein is a prolonged peripheral seat port extending through several head positions beyond tipping-off position and adapted to open and relieve the disk ports and head passages of the respective heads before repeated operations on new lamps therein.

53. An automatic machine for exhausting and tipping-off electric lamps, comprising a conveyor carrying a series of heads and having means to advance it to cause each head to travel around a circuit from station to station, each head having an axially liftable holder for the lamp, and for each head an exhaust passage, and a coupling for connecting the lamp stem exhaust tube to such exhaust passage; in combination with means to close the coupling of each head thereby to grip and hold the lamp exhaust tube and connect it with the exhaust passage, exhausting connections operative after closing of said coupling for exhausting the lamp or gas-filling it via said exhaust passage, means at a subsequent station for tipping-off each exhausted or filled lamp comprising a burner providing a flame directed upon the lamp exhaust tube, means at the tipping-off station first to lift the bulb holder and burner sufficiently to stretch and seal the softened exhaust tube during and then to lift the holder without the burner to a substantially higher point for outfeeding the lamp, and automatic outfeeding means at the tipping-off station, operating on the lamp at such higher point.

54. An automatic sealing-in and exhausting machine for electric lamps, comprising a conveyor carrying a series of heads and having means to advance it to cause each head to travel around a perdetermined circuit, each head having an axially liftable holder for the lamp bulb part, adapted to position the bulb in relation to the stem, and a coupling for connecting the lamp stem exhaust tube to an exhaust passage; in combination with means to apply heat to fuse together the bulb skirt and stem and thus seal-in the lamp, means to close the coupling of each head to grip and hold the lamp exhaust tube, connections for exhausting the lamp or gas-filling it via said exhaust passage, means for tipping-off each exhausted or filled lamp comprising a burner providing a flame directed upon the exhaust tube, timed means operating to lift the bulb holder immediately after the sealing-in to stretch the seal between bulb and stem and thereupon promptly to lower the holder, during travel, leaving the lamp upheld only by its exhaust tube, and other timed means working at a later station to lift the holder during tipping-off said other timed means comprising a cam device operating during the pause of the head, first to lift the holder sufficiently to engage, support and steady the lamp as the tube softens, and there to pause in such lift, and thereafter to lift further for stretching the tube, and completing the tipping-off.

55. An automatic lamp sealing-in and exhausting machine, comprising a conveyor carrying a series of heads and having means to advance it to cause each head to travel step by step from station to station around a predetermined circuit, each head having a rotatable support for the lamp stem, and a rotatable holder for the lamp bulb adapted to position the bulb in relation to the stem, and for each head an exhaust passage, and a coupling for connecting the lamp stem exhaust tube to such exhaust passage; in combination with mechanism to rotate said bulb holder and stem support of each head during a first period of travel while the coupling remains open and flames are applied to fuse together the bulb skirt and stem flange and thus seal-in the lamp, mechanism to close the coupling of each head after the period of head rotation thereby to connect the sealed-in lamp with the exhaust passage, exhausting connections operative after closing of said coupling during a second period of head travel for exhausting the lamp or gas-filling it via said exhaust passage, and means for tipping-off at a later station each exhausted or filled lamp comprising a burner providing a flame directed upon its exhaust tube; and characterized further in that the tipping-off means comprises mechanism operating to lift preliminarily the bulb holder to a position to steady the lamp during softening of the exhaust tube and then to pause there, and then to lift further to stretch the tube in aid of tipping-off while the lower part of the tube is held, and finally to lift substantially higher to an outfeeding position, at the tipping-off station.

DONALD G. TRUTNER.